US012180353B2

(12) United States Patent
Chaudhary et al.

(10) Patent No.: US 12,180,353 B2
(45) Date of Patent: *Dec. 31, 2024

(54) POLYMERIC COMPOSITION CONTAINING A LIGHT STABILIZER

(71) Applicants: Dow Global Technologies LLC, Midland, MI (US); Rohm and Haas Company, Collegeville, PA (US)

(72) Inventors: Bharat I. Chaudhary, Princeton, NJ (US); Xindi Yu, Phoenixville, PA (US); Yichi Zhang, Novi, MI (US); Peter C. Dreux, Lumberton, NJ (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 886 days.

This patent is subject to a terminal disclaimer.

(21) Appl. No.: 17/050,494

(22) PCT Filed: Apr. 26, 2019

(86) PCT No.: PCT/US2019/029343
§ 371 (c)(1),
(2) Date: Oct. 26, 2020

(87) PCT Pub. No.: WO2019/210163
PCT Pub. Date: Oct. 31, 2019

(65) Prior Publication Data
US 2021/0189109 A1   Jun. 24, 2021

Related U.S. Application Data

(60) Provisional application No. 62/663,499, filed on Apr. 27, 2018.

(51) Int. Cl.
| | | |
|---|---|---|
| *C08L 23/08* | (2006.01) | |
| *C08F 210/02* | (2006.01) | |
| *C08K 3/016* | (2018.01) | |
| *C08K 5/00* | (2006.01) | |
| *C08K 5/3492* | (2006.01) | |
| *C08L 43/04* | (2006.01) | |
| *C08L 51/06* | (2006.01) | |
| *C09D 123/08* | (2006.01) | |
| *H01B 3/44* | (2006.01) | |

(52) U.S. Cl.
CPC ........ *C08L 23/0892* (2013.01); *C08F 210/02* (2013.01); *C08K 3/016* (2018.01); *C08K 5/005* (2013.01); *C08K 5/0066* (2013.01); *C08K 5/34926* (2013.01); *C08L 43/04* (2013.01); *C08L 51/06* (2013.01); *C09D 123/0892* (2013.01); *H01B 3/441* (2013.01); *C08K 2201/019* (2013.01); *C08L 2203/202* (2013.01)

(58) Field of Classification Search
CPC .............. C08K 2201/019; C08K 3/016; C08K 5/005; C08K 5/0066; C08K 5/34926; C08L 2203/202; C08L 23/0892; C08L 43/04; C08L 51/06; C09D 123/0892; H01B 3/441; C08F 210/02
See application file for complete search history.

(56) References Cited

U.S. PATENT DOCUMENTS

| | | | |
|---|---|---|---|
| 3,225,018 A | 12/1965 | Zutty | |
| 4,477,615 A * | 10/1984 | Raspanti | C07D 251/52 544/212 |
| 4,574,133 A | 3/1986 | Umpleby | |
| 5,246,783 A | 9/1993 | Spenadel et al. | |
| 6,007,913 A * | 12/1999 | Cogen | H01B 3/441 428/378 |
| 6,496,629 B2 | 12/2002 | Ma et al. | |
| 6,714,707 B2 | 3/2004 | Rossi et al. | |
| 11,021,585 B2 | 6/2021 | Mueller et al. | |
| 2007/0027250 A1* | 2/2007 | Joseph | C08L 23/0815 524/515 |
| 2012/0073631 A1* | 3/2012 | Ikenaga | H01L 31/0481 525/240 |
| 2013/0079448 A1 | 3/2013 | Biscoglio | |
| 2013/0203904 A1 | 8/2013 | Maestri et al. | |
| 2018/0030222 A1* | 2/2018 | Mueller | B29C 48/08 |
| 2021/0238438 A1* | 8/2021 | Chaudhary | C08F 210/02 |

FOREIGN PATENT DOCUMENTS

| | | |
|---|---|---|
| CN | 105462039 | 4/2016 |
| EP | 2430641 A2 | 3/2012 |
| JP | 2004067974 | 3/2004 |

(Continued)

OTHER PUBLICATIONS

Office Action from corresponding Japanese Application No. 2020-558596 dated Jun. 1, 2023.
Office Action Report Letter from corresponding Indian Patent Application No. 202017047829 dated May 10, 2022.
Office Action Report Letter from corresponding Chinese Patent Application No. 201980032604.5 dated May 19, 2022.
Otocka, "Distribution of Long and Short Branches in Low-Density Polyethylenes", Macromolecules, 1971, pp. 507, vol. 4, No. 4.
Scholte, "Mark-Houwink Equation and GPC Calibration for Linear Short-Chained Branched Polyolefins, Including Polypropylene and Ethylene-Propylene Copolymers", J. Appl. Polym. Sci., 1984, pp. 3763-3782, vol. 29.
Singh, "Synthesis of New Polymeric Hindered Amine Light Stabilizers: Performance Evaluation in Styrenic Polymers", 3 Journal of Applied Polymer Science, 2003, pp. 1126-1138, vol. 90.

(Continued)

*Primary Examiner* — Lynda Salvatore

(57) ABSTRACT

The present disclosure provides a composition. The composition includes a silane functionalized polyolefin; a flame retardant; and a hindered amine light stabilizer (HALS) having a Mw greater than 5,000 Dalton. The present disclosure also provides a coated conductor. The coated conductor includes a conductor and a coating on the conductor, the coating including a composition. The coating composition includes a silane functionalized polyolefin; a flame retardant; and a hindered amine light stabilizer (HALS) having a Mw greater than 5,000 Dalton.

5 Claims, No Drawings

(56) References Cited

FOREIGN PATENT DOCUMENTS

| | | |
|---|---|---|
| JP | 2004346100 A | 12/2004 |
| JP | 2018060843 | 4/2018 |
| JP | 2019057585 | 4/2019 |
| WO | 2004031294 | 4/2004 |
| WO | 2010132766 A2 | 11/2010 |
| WO | 2011139635 A1 | 11/2011 |
| WO | 2011156077 | 12/2011 |
| WO | 2016131791 | 8/2016 |
| WO | 2017074707 | 5/2017 |
| WO | 2018049117 | 3/2018 |

OTHER PUBLICATIONS

Office Action Report from corresponding Chinese Application No. 201980032604.5 dated Dec. 2, 2022.

\* cited by examiner

POLYMERIC COMPOSITION CONTAINING A LIGHT STABILIZER

FIELD

The present disclosure relates to moisture curable compositions. In one aspect, the disclosure relates to moisture curable compositions with suitable wet electrical insulation resistance and/or suitable retained dielectric strength after glancing impact, while in another aspect, the disclosure relates to insulation or jacket layers for wires and cables comprising a moisture curable composition and coated conductors including the same.

BACKGROUND

Moisture-curable compositions containing a silane-functionalized polyolefin (e.g., a silane-grafted polyolefin) are frequently used to form coatings, and particularly insulation or jacket layers, for wires and cables. To improve the ultraviolet (UV) light stabilization of the compositions, a light stabilizer or combination of stabilizers is added (such as hindered amine light stabilizers). Often, the compositions contain flame retardants, which can be halogen-free or halogenated. However, coated conductors with coating compositions containing conventional hindered amine light stabilizers and halogen-free flame retardants exhibit unacceptably low wet electrical insulation resistance over prolonged periods of time at elevated temperatures. Furthermore, conventional coated conductors with coating compositions containing conventional hindered amine light stabilizers and flame retardants can exhibit inferior or unacceptably low retained dielectric strength after glancing impact.

The art recognizes the need for a coating composition containing a light stabilizer that exhibits wet electrical insulation resistance suitable for wire and cable applications. The art further recognizes the need for a halogen-free moisture curable coating composition containing a halogen-free flame retardant and a light stabilizer that exhibits wet electrical insulation resistance suitable for wire and cable applications. The art also recognizes the need for a moisture curable coating composition containing a flame retardant and a light stabilizer that exhibits retained dielectric strength after glancing impact suitable for wire and cable applications.

SUMMARY

The present disclosure provides a composition that is suitable for wire and cable applications. The composition includes a silane functionalized polyolefin; a flame retardant; and a hindered amine light stabilizer (HALS) having a weight average molecular weight, Mw, greater than 5,000 Dalton (g/mol).

The present disclosure also provides a composition, and further a halogen-free flame retardant composition, that is suitable for wire and cable applications. The composition includes a silane functionalized polyolefin; a halogen-free flame retardant; and a HALS having a weight average molecular weight, Mw, greater than 5,000 Dalton.

The present composition provides a coated conductor. The coated conductor includes a conductor and a coating on the conductor, the coating including a composition. The composition includes a silane functionalized polyolefin; a flame retardant; and a HALS having a weight average molecular weight, Mw, greater than 5,000 Dalton.

The present composition also provides a coated conductor, and further a halogen-free coated conductor. The coated conductor includes a conductor and a coating on the conductor, the coating including a composition. The composition includes a silane functionalized polyolefin; a halogen-free flame retardant; and a HALS having a weight average molecular weight, Mw, greater than 5,000 Dalton.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

"Alkoxy" (or "alkoxy group") refers to the —OZ radical, where representative Z include alkyl, substituted alkyl, cycloalkyl, substituted cycloalkyl, heterocycloalkyl, substituted heterocycloalkyl, silyl groups and combinations thereof. Nonlimiting examples of suitable alkoxy radicals include methoxy, ethoxy, benzyloxy, and t-butoxy.

"Alkyl" and "alkyl group" refer to a saturated linear, cyclic, or branched hydrocarbon group.

"Alkenyl" or "alkenyl group" refer to a hydrocarbyl group containing at least one C=C double bond. Alkenyl groups may be linear, cyclic or branched. Nonlimiting examples of suitable alkenyl groups include ethenyl groups, n-propenyl groups, i-propenyl groups, n-butenyl groups, t-butenyl groups, i-butenyl groups, etc.

"Aralkyl" and "aralkyl group" refer to an organic radical derived from aromatic hydrocarbon by replacing one or more hydrogen atoms with an aryl group.

"Aryl" and "aryl group" refer to an organic radical derived from aromatic hydrocarbon by deleting one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl and the like.

"Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, or 3 to 20 carbon atoms, or 4 to 10 carbon atoms, or 4 to 8 carbon atoms. Nonlimiting examples of α-olefins include ethylene, propylene, 1-butene, 1-pentene, 1-hexene, 1-octene, 1-dodecene, and mixtures of two or more of these monomers.

"Blend," "polymer blend" and like terms refer to a composition of two or more polymers. Such a blend mayor may not be miscible. Such a blend mayor may not be phase separated. Such a blend may or may not contain one or more domain configurations, as determined from transmission electron spectroscopy, light scattering, x-ray scattering, and any other method used to measure and/or identify domain configurations.

A "cable" is at least one conductor, e.g., wire, optical fiber, etc., within a protective insulation, jacket, sheath. A cable may be two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496,629; and 6,714,707. The cable can be designed for low, medium, and/or high voltage applications.

"Carboxylate" refers to a salt or ester of carboxylic acid. "Carboxylic acid" is an organic acid containing a carboxyl group (—COOH).

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "conductor" is one or more wire(s), or one or more fiber(s), for conducting heat, light, and/or electricity at any voltage (DC, AC, or transient). The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic. The conductor may or may not be disposed in a protective sheath. The conductor may be a single cable or a plurality of cables bound together (i.e., a cable core, or a core).

"Crosslinkable" and "curable" indicate that the polymer, before or after shaped into an article, is not cured or crosslinked and has not been subjected or exposed to treatment that has induced substantial crosslinking although the polymer comprises additive(s) or functionality that will effectuate substantial crosslinking upon subjection or exposure to such treatment (e.g., exposure to water).

"Crosslinked" and similar terms indicate that the polymer composition, before or after it is shaped into an article, has xylene or decalin extractables of less than or equal to 90 weight percent (i.e., greater than or equal to 10 weight percent gel content).

"Cured" and similar terms indicate that the polymer, before or after it is shaped into an article, was subjected or exposed to a treatment which induced crosslinking.

An "ethylene-based polymer," "ethylene polymer," or "polyethylene" is a polymer that contains equal to or greater than 50 wt %, or a majority amount of polymerized ethylene based on the weight of the polymer, and, optionally, may comprise one or more comonomers. The generic term "ethylene-based polymer" thus includes ethylene homopolymer and ethylene interpolymer.

A suitable comonomer is an alpha-olefin. "Ethylene-based polymer" and the term "polyethylene" are used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. Polyethylene may also be produced in a high pressure reactor without a catalyst.

An "ethylene/α-olefin polymer" is an polymer that contains a majority amount of polymerized ethylene, based on the weight of the polymer, and one or more α-olefin comonomers.

"Functional group" and like terms refer to a moiety or group of atoms responsible for giving a particular compound its characteristic reactions. Nonlimiting examples of functional groups include heteroatom-containing moieties, oxygen-containing moieties (e.g., hydrolysable silane, alcohol, aldehyde, ester, ether, ketone, and peroxide groups), and nitrogen-containing moieties (e.g., amide, amine, azo, imide, imine, nitrate, nitrile, and nitrite groups).

A "halogen" is an element in IUPAC Group 17 of the Periodic Table of Elements, which includes fluorine (F), chlorine (Cl), bromine (Br), iodine (I), and astatine (At).

"Halogen-free" refers to a flame retardant, a composition, or a coated conductor that substantially excludes halogen, or excludes halogen. A flame retardant, composition, or coated conductor that substantially excludes halogen contains from 0 mg/kg, or greater than 0 mg/kg to less than 2,000 mg/kg halogen, based on the total weight of flame retardant, composition, or coated conductor, as measured by ion chromatography (IC), or a similar analytical method.

A "heteroatom" is an atom other than carbon or hydrogen. The heteroatom can be a non-carbon atom from Groups IV, V, VI and VII of the Periodic Table. Nonlimiting examples of heteroatoms include: F, N, O, P, B, S, and Si.

The terms "hydrocarbyl" and "hydrocarbon" refer to substituents containing only hydrogen and carbon atoms, including branched or unbranched, saturated or unsaturated, cyclic, polycyclic or noncyclic species. Nonlimiting examples include alkyl-, cycloalkyl-, alkenyl-, alkadienyl-, cycloalkenyl-, cycloalkadienyl-, aryl-, and alkynyl-groups.

A "hydrolysable silane group" is a silane group that will react with water. These include alkoxysilane groups on monomers or polymers that can hydrolyze to yield silanol groups, which in turn can condense to crosslink the monomers or polymers.

A "jacket" is an outermost coating on the conductor. When the conductor includes a single coating, the coating may serve as both a jacket and an insulation on the conductor.

"Low density polyethylene" (or "LDPE") is an ethylene homopolymer, or an ethylene/α-olefin copolymer comprising at least one $C_3$-$C_{10}$ α-olefin, or a $C_3$-$C_4$α-olefin, that has a density from 0.915 g/cc to 0.925 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Metals" includes all elements listed as metals in the Periodic Table of Elements, including Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, La, Hf, Ta, W, Re, Ir, Pt, Au, Hg, Tl, Pb, Bi, Po, Fr, Ra, and Ac, and the lanthanides and actinides.

"Moisture curable" and "moisture crosslinkable" indicate that the composition will cure, i.e., crosslink, upon exposure to water. Moisture cure can be with or without the assistance of a crosslinking catalyst (e.g., a silanol condensation catalyst), promoter, etc.

An "olefin-based polymer" or "polyolefin" is a polymer that contains equal to or greater than 50 wt %, or a majority amount of polymerized olefin monomer (based on the weight of the polymer), and optionally, may contain at least one comonomer. Nonlimiting examples of α-olefin monomer include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene. Nonlimiting examples of an olefin-based polymer include an ethylene-based polymer and a propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin comonomers. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer," "propylene polymer," or "polypropylene" is a polymer that contains equal to or greater than 50 wt %, or a majority amount of polymerized propylene based on the weight of the polymer, and, optionally, may comprise one or more comonomers. The generic term "propylene-based polymer" thus includes propylene homopolymer and propylene interpolymer.

A "sheath" is a generic term and when used in relation to cables, it includes insulation coverings or layers, protective jackets and the like.

A "wire" is a single strand of conductive metal, e.g., copper or aluminum, or a single strand of optical fiber.

Test Methods

Crush resistance is measured in accordance with Section 620 of UL-1581, or Section 7.11 of UL2556 (condition: 14AWG (American Wire Gauge)). The result is recorded in pounds-force (lb-f). The average of ten measurements is reported. The reported crush resistance values are the ultimate values, not those from an initial peak (if any exists).

Density is measured in accordance with ASTM D792, Method B. The result is recorded in grams (g) per cubic centimeter (g/cc or g/cm$^3$).

The Horizontal Burn Test is conducted in accordance with UL-2556. The test is performed by placing the coated conductor in a horizontal position. Cotton is placed underneath the coated conductor. A burner is set at a 20 angle relative to the horizontal sample (14 AWG copper wire with 30 mil coating wall thickness). A one-time flame is applied to the middle of the sample for 30 seconds. The sample fails when (i) the cotton ignites and/or (ii) the sample chars in excess of 100 mm. Char length is measured in accordance with UL-1581, 1100.4.

Hot creep is measured in accordance with UL-2556 Section 7.9 for conductor sizes of 8 AWG or smaller. Tests are conducted on insulation and/or jacket layers that have been removed (stripped) from conductors. Two marks spaced 25 mm apart are marked on a sample. The sample is then placed into an oven at 150° C. under a load of 20 N/cm$^2$ (0.2 MPa) for 15 minutes. The distance between the initial marks is re-measured and the hot creep elongation is recorded (as a percentage).

Hot deformation is measured on coated conductors according to Section 7.8, UL-2556 (conditions: 131° C. for 30 minutes; 500 gram load) and is reported as a percentage.

Melt index (MI) (also known as $I_2$) is measured in accordance with ASTM D1238, Condition 190° C./2.16 kilogram (kg) weight and is reported in grams eluted per 10 minutes (g/10 min).

Melting Point (Tm) is measured by the Differential Scanning Calorimetry (DSC) technique for measuring the melting peaks of polyolefins as described in U.S. Pat. No. 5,783,638. The melting point is reported in degrees Celsius (° C.).

Retained dielectric strength (also known as AC breakdown, or ACBD) after glancing impact is determined on 14 AWG copper wire with an insulation layer, in accordance with UL 2556 Section 7.14, Edition Number: 4, Edition Date: Dec. 15, 2015. ACBD is measured before and after impact. The ACBD of six specimens before impact and six specimens (per coated conductor construction) after impact is measured, and the average values of ACBD are computed before and after impact (excluding the highest and lowest values measured after glancing impact). Retained ACBD after glancing impact (average value) is recorded as a percentage of the average value before impact.

Shore A hardness is measured in accordance with ASTM D2240.

Shore D hardness is measured in accordance with ASTM D2240.

Tensile strength (stress at break) and tensile elongation (strain at break) are measured in accordance with UL 2556 Section 3.5. Tensile stress at break and tensile elongation at break are measured with an Instron model 4201. Tests are conducted on insulation and/or jacket layers that have been removed (stripped) from conductors. The testing conditions are 20 inches per minute crosshead speed, 2.5 inch jaw span with a 100 pound load cell. Tensile stress at break is recorded in pounds per square inch (psi). Tensile elongation is recorded as a percentage.

The VW-1 Burn Test is conducted by subjecting three or five samples of a specific coated conductor to the protocol of UL 2556 Section 9.4. This involves five 15-second applications of a 125 mm flame impinging on at an angle 20° on a vertically oriented specimen 610 mm (24 in) in length. A strip of kraft paper 12.5±1 mm (0.5±0.1 in) is affixed to the specimen 254±2 mm (10±0.1 in) above the impingement point of the flame. A continuous horizontal layer of cotton is placed on the floor of the test chamber, centered on the vertical axis of the test specimen, with the upper surface of the cotton being 235±6 mm (9.25±0.25 in) below the point at which the tip of the blue inner cone of the flame impinges on the specimen. Test failure is based upon the criteria of either burning the 25% of the kraft papertape flag, ignition of the cotton batting or if the specimen burns longer than 60 seconds on any of the five flame applications. As an additional measure of burn performance, the length of uncharred insulation is measured at the completion of the test.

Wet insulation resistance (IR) is measured in accordance with UL-44. Wet IR is measured on a coiled moisture cured coated conductor (14 AWG copper wire with nominal 30 mil coating thickness), of which a 10 ft (3.048 meter) length of wire is immersed in an electrical water bath at 90° C. The wire is connected to a megohmmeter in a manner such that the water is one electrode and the wire conductor is the other electrode. In that manner, the direct current (DC) electrical resistance of the coating is measured with 500 V applied. The initial measurement is taken after 6-24 hours of submersion, and all subsequent measurements are taken on a 7-day frequency for a period of typically up to 36 weeks, while the sample is aged under 600 V alternating current (AC).

The wet insulation resistance ratio (the wet IR ratio) is computed by dividing the average wet IR recorded in weeks 7-9 by the average wet IR recorded in weeks 4-6.

Size Exclusion Chromatography (SEC)

Weight average molecular weight (Mw), number average molecular weight (Mn), and Mw/Mn, are determined by conventional size exclusion chromatography (SEC). The technique uses a differential reflectometer as concentration sensor and a relative calibration built with polystyrene (PS) standards with molecular weight distribution (MWD) narrow.

Samples are solubilized in the SEC mobile phase at the desired concentration. A Waters modular chromatographic HPLC/SEC system is used.

During sample characterization, the chromatographic system has the following conditions:
Mobile Phase: THF +0.08 M diethanolamine
Columns Bench: 2 Mesopore Polymer Laboratories
Temperature: 30° C.
Flow: 0.6 l/min
Degassing: helium
Concentration: >>10 mg/ml
Injection volume: 50 μL
Test time: 40 minutes
Calibration: polynomial relative of 3° order built with 8 polystyrene (PS) standards with MWD narrow with peak molecular weight (Mp) of between 95000 g/mol and 382 g/mol.

DETAILED DESCRIPTION

The present disclosure provides a composition suitable for wire and cable applications. The composition includes: a silane functionalized polyolefin; a flame retardant; a hindered amine light stabilizer (HALS) having a having a weight average molecular weight, Mw, greater than 5,000 Dalton (g/mol); and optionally, an additive.

In an embodiment, the composition includes: a silane functionalized polyolefin; a halogen-free flame retardant; a hindered amine light stabilizer (HALS) having a having a weight average molecular weight, Mw, greater than 5,000 Dalton (g/mol); and optionally, an additive.

A. Silane Functionalized Polyolefin

The present composition includes a silane functionalized polyolefin. A "silane functionalized polyolefin" is a polymer that contains silane and equal to or greater than 50 wt %, or a majority amount, of polymerized α-olefin, based on the total weight of the polymer. Nonlimiting examples of suitable silane functionalized polyolefin include α-olefin/silane copolymer, silane-grafted polyolefin (Si-g-PO), and combinations thereof.

An "α-olefin/silane copolymer" is formed by the copolymerization of an α-olefin (such as ethylene) and a hydrolysable silane monomer (such as a vinyl alkoxysilane monomer). In an embodiment, the α-olefin/silane copolymer is an ethylene/silane copolymer prepared by the copolymerization of ethylene, a hydrolysable silane monomer and, optionally, an unsaturated ester. The preparation of ethylene/silane copolymers is described, for example, in U.S. Pat. Nos. 3,225,018 and 4,574,133, each incorporated herein by reference.

A "silane-grafted polyolefin" (or "Si-g-PO") is formed by grafting a hydrolysable silane monomer (such as a vinyl alkoxysilane monomer) onto the backbone of a base polyolefin (such as polyethylene). In an embodiment, grafting takes place in the presence of a free-radical generator, such as a peroxide. The hydrolysable silane monomer can be grafted to the backbone of the base polyolefin (i) prior to incorporating or compounding the Si-g-PO into a composition used to make a final article, such as a coated conductor (also known as a SIOPLAS™ process), or (ii) simultaneously with the extrusion of a composition to form a final article (also known as a MONOSIL™ process, in which the Si-g-PO is formed in situ during melt blending and extrusion). In an embodiment, the Si-g-PO is formed before the Si-g-PO is compounded with a halogen-free flame retardant, HALS, and other optional components. In another embodiment, the Si-g-PO is formed in situ by compounding a polyolefin, hydrolysable silane monomer, peroxide initiator, and silanol condensation catalyst along with a halogen-free flame retardant, HALS, and other optional components.

The base polyolefin for the Si-g-PO may be an ethylene-based polymer or a propylene-based polymer. In an embodiment, the base polyolefin is an ethylene-based polymer, resulting in a silane-grafted ethylene-based polymer (Si-g-PE). Non-limiting examples of suitable ethylene-based polymers include ethylene homopolymers and ethylene-based interpolymers containing one or more polymerizable comonomers, such as an unsaturated ester and/or an α-olefin.

The hydrolysable silane monomer used to make an α-olefin/silane copolymer or a Si-g-PO is a silane-containing monomer that will effectively copolymerize with an α-olefin (e.g., ethylene) to form an α-olefin/silane copolymer (e.g., an ethylene/silane copolymer) or graft to an α-olefin polymer (e.g., a polyolefin) to form a Si-g-PO. Exemplary hydrolysable silane monomers are those having the following Structure (A):

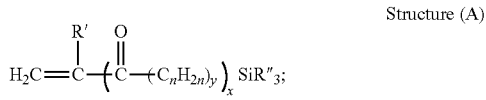

Structure (A)

wherein R' is a hydrogen atom or methyl group; x and y are 0 or 1 with the proviso that when x is 1, y is 1; n is an integer from 1 to 12 inclusive, or n is an integer from 1 to 4, and each R independently is a hydrolysable organic group such as an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl.

Nonlimiting examples of suitable hydrolysable silane monomers include silanes that have an ethylenically unsaturated hydrocarbyl group, such as vinyl, allyl, isopropenyl, butenyl, cyclohexenyl or gamma-(meth)acryloxy allyl group, and a hydrolysable group, such as, for example, a hydrocarbyloxy, hydrocarbonyloxy, or hydrocarbylamino group. Examples of hydrolysable groups include methoxy, ethoxy, formyloxy, acetoxy, propionyloxy, and alkyl or arylamino groups.

In an embodiment, the hydrolysable silane monomer is an unsaturated alkoxysilane such as vinyl trimethoxysilane (VTMS), vinyl triethoxysilane, vinyl triacetoxy silane, gamma-(meth)acryloxy, propyl trimethoxy silane, and mixtures of these silanes.

Nonlimiting examples of suitable unsaturated esters used to make an α-olefin/silane copolymer include alkyl acrylate, alkyl methacrylate, or vinyl carboxylate. Nonlimiting examples of suitable alkyl groups include methyl, ethyl, n-propyl, i-propyl, n-butyl, t-butyl, etc. In an embodiment, the alkyl group has from 1, or 2 to 4, or 8 carbon atoms. Nonlimiting examples of suitable alkyl acrylates include ethyl acrylate, methyl acrylate, t-butyl acrylate, n-butyl acrylate, and 2-ethylhexyl acrylate. Nonlimiting examples of suitable alkyl methacrylates include methyl methacrylate and n-butyl methacrylate. In an embodiment, the carboxylate group has from 2 to 5, or 6, or 8 carbon atoms. Nonlimiting examples of suitable vinyl carboxylates include vinyl acetate, vinyl propionate, and vinyl butanoate.

In an embodiment, the silane functionalized polyolefin contains from 0.1 wt %, or 0.3 wt %, or 0.5 wt %, or 0.8 wt %, or 1.0 wt %, or 1.2 wt %, or 1.5 wt %, or 1.6 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt % silane, based on the total weight of the silane functionalized polyolefin.

In an embodiment, the silane functionalized polyolefin has a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.930 g/cc, or 0.940 g/cc, or 0.950 g/cc or 0.960 g/cc, or 0.965 g/cc.

In an embodiment, the silane functionalized polyolefin is a silane functionalized polyethylene. A "silane functionalized polyethylene" is a polymer that contains silane and equal to or greater than 50 wt %, or a majority amount, of polymerized ethylene, based on the total weight of the polymer.

In an embodiment, the silane functionalized polyethylene contains (i) from 50 wt %, or 55 wt %, or 60 wt %, or 65 wt %, or 70 wt %, or 80 wt %, or 90 wt %, or 95 wt % to 97 wt %, or 98 wt %, or 99 wt %, or less than 100 wt % ethylene and (ii) from 0.1 wt %, or 0.3 wt % or 0.5 wt %, or 0.8 wt %, or 1.0 wt %, or 1.2 wt %, or 1.5 wt %, or 1.6 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt % silane, based on the total weight of the silane functionalized polyethylene.

In an embodiment, the silane functionalized polyethylene has a melt index (MI) from 0.1 g/10 min, or 0.5 g/10 min, or 1.0 g/10 min, or 2 g/10 min, or 3 g/10 min, or 5 g/10 min, or 8 g/10 min, or 10 g/10 min, or 15 g/10 min, or 20 g/10 min, or 25 g/10 min, or 30 g/10 min to 40 g/10 min, or 45 g/10 min, or 50 g/10 min, or 55 g/10 min, or 60 g/10 min, or 70 g/10 min, or 80 g/10 min, or 90 g/10 min.

In an embodiment, the silane functionalized polyethylene is an ethylene/silane copolymer. The ethylene/silane copolymer contains ethylene and the hydrolyzable silane monomer as the only monomeric units. In another embodiment, the ethylene/silane copolymer optionally includes a $C_3$, or $C_4$ to $C_6$, or $C_8$, or $C_{10}$, or $C_{12}$, or $C_{16}$, or $C_{18}$, or $C_{20}$ α-olefin; an unsaturated ester; and combinations thereof. In an embodiment, the ethylene/silane copolymer is an ethylene/unsaturated ester/silane reactor copolymer. Non-limiting examples of suitable ethylene/silane copolymers include SI-LINK™ DFDA-5451NT and SI-LINK™ AC DFDB-5451NT, each available from The Dow Chemical Company.

The α-olefin/silane reactor copolymer, and further the ethylene/silane reactor copolymer may comprise two or more embodiments disclosed herein.

In an embodiment, the silane functionalized polyethylene is a Si-g-PE.

The base ethylene-based polymer for the Si-g-PE includes from 50 wt %, or 55 wt %, or 60 wt %, or 65 wt %, or 70 wt %, or 80 wt %, or 90 wt %, or 95 wt % to 97 wt %, or 98 wt %, or 99 wt %, or 100 wt % ethylene, based on the total weight of the base ethylene-based polymer.

In an embodiment, the base ethylene-based polymer for the Si-g-PE has a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.930 g/cc, or 0.940 g/cc, or 0.950 g/cc, or 0.960 g/cc, or 0.965 g/cc.

In an embodiment, the base ethylene-based polymer for the Si-g-PE has a melt index (MI) from 0.1 g/10 min, or 0.5 g/10 min, or 1.0 g/10 min, or 2 g/10 min, or 3 g/10 min, or 5 g/10 min, or 8 g/10 min, or 10 g/10 min, or 15 g/10 min, or 20 g/10 min, or 25 g/10 min, or 30 g/10 min to 40 g/10 min, or 45 g/10 min, or 50 g/10 min, or 55 g/10 min, or 60 g/10 min, or 70 g/10 min, or 80 g/10 min, or 90 g/10 min.

In an embodiment, the base ethylene-based polymer for the Si-g-PE is an ethylene/α-olefin copolymer. The α-olefin contains from 3, or 4 to 6, or 8, or 10, or 12, or 16, or 18, or 20 carbon atoms. Non-limiting examples of suitable α-olefin include propylene, butene, hexene, and octene.

In an embodiment, the ethylene-based copolymer is an ethylene/octene copolymer. When the ethylene-based copolymer is an ethylene/α-olefin copolymer, the Si-g-PE is a silane-grafted ethylene/α-olefin copolymer. Non-limiting examples of suitable ethylene/α-olefin copolymers useful as the base ethylene-based polymer for the Si-g-PE include the ENGAGE™ and INFUSE™ resins available from the Dow Chemical Company.

In an embodiment, the base ethylene-based polymer for the Si-g-PE is an ethylene plastomer or elastomer. "Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_4$-$C_8$ α-olefin comonomer.

Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

In an embodiment, the Si-g-PE is a silane-grafted ethylene/$C_4$-$C_8$ α-olefin copolymer. The silane-grafted ethylene/$C_4$-$C_8$ α-olefin copolymer consists of the hydrolyzable silane monomer, ethylene, and $C_4$-$C_8$ α-olefin comonomer. In other words, the silane-grafted ethylene/$C_4$-$C_8$ α-olefin copolymer contains the hydrolyzable silane monomer, ethylene, and $C_4$-$C_8$ α-olefin comonomer as the only monomeric units.

In an embodiment, the Si-g-PE is a silane-grafted ethylene/$C_4$-$C_8$ α-olefin copolymer. The silane-grafted ethylene/$C_4$-$C_8$ α-olefin copolymer consists of the hydrolyzable silane monomer, ethylene, and $C_4$-$C_8$ α-olefin comonomer. The silane-grafted ethylene/$C_4$-$C_8$ α-olefin copolymer has one, some, or all of the following properties: (a) a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.925 g/cc, or 0.930 g/cc, or 0.935 g/cc; and/or (b) a melt index from 0.1 g/10 min, or 0.5 g/10 min, or 1 g/10 min, or 2 g/10 min, or 5 g/10 min, or 8 g/10 min, or 10 g/10 min, or 15 g/10 min, or 20 g/10 min, or 25 g/10 min, or 30 g/10 min to 40 g/10 min, or 45 g/10 min, or 50 g/10 min, or 55 g/10 min, or 60 g/10 min, or 65 g/10 min, or 70 g/10 min, or 75 g/10 min, or 80 g/10 min, or 90 g/10 min; and/or (c) a silane content of from 0.1 wt %, or 0.3 wt %, or 0.5 wt %, or 0.8 wt %, or 1.0 wt %, or 1.2 wt %, or 1.5 wt %, or 1.6 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt %, based on the total weight of the silane-grafted ethylene/$C_4$-$C_8$ α-olefin copolymer.

The Si-g-PE may comprise two or more embodiments disclosed herein.

In an embodiment, the composition contains from 20 wt %, or 25 wt %, or 30 wt %, or 35 wt % to 36 wt %, or 40 wt %, or 45 wt %, or 50 wt %, or 55 wt %, or 60 wt %, or 65 wt %, or 70 wt %, or 75 wt %, or 80 wt % of the silane functionalized polyolefin, based on the total weight of the composition.

Blends of silane functionalized polyolefins may also be used, and the silane-functionalized polyolefin(s) may be diluted with one or more other polyolefins to the extent that the polyolefins are (i) miscible or compatible with one another, and (ii) the silane functionalized polyolefin(s) constitutes from 40 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt % to less than 100 wt % of the blend (based on the combined weight of the polyolefins, including the silane functionalized polyolefin).

In an embodiment, the composition includes the silane-functionalized polyolefin and a polyolefin that is an ethylene-based polyolefin. The ethylene-based polyolefin is different than the silane functionalized polyolefin because the ethylene-based polyolefin is not silane functionalized.

In an embodiment, the ethylene-based polyolefin is an ethylene plastomer or elastomer. In another embodiment, the ethylene-based polyolefin is an LDPE. In another embodiment, the ethylene-based polyolefin is an ethylene/α-olefin copolymer, or further a maleic-anhydride (MAH)-grafted ethylene/α-olefin copolymer. In an embodiment, the α-olefin is a $C_4$-$C_{8a}$-olefin. In another embodiment, the ethylene-based polyolefin is a copolymer of ethylene and maleic anhydride (such as ZeMacm E60 or ZeMac™ M603, available from Vertellus Holdings LLC), or a random ethylene copolymer with a comonomer that is classified as being a maleic anhydride equivalent for application purposes (such as FUSABOND™ M603, available from DuPont).

In an embodiment, the composition includes a polymeric blend containing, consisting essentially of, or consisting of the silane-functionalized polyolefin; optionally, one or more ethylene plastomer or elastomer; optionally, one or more MAH-grafted ethylene/$C_4$-$C_8$ α-olefin copolymer; and optionally, one or more LDPE. The silane functionalized polyolefin constitutes from 40 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt % to less than 100 wt % of the polymeric blend. In an embodiment, the polymeric blend contains, consists essentially of, or consists of (i) from 40 wt %, or 50 wt %, or 55 wt %, or 60 wt %, or 65 wt % to 70 wt %, or 75 wt %, or 80 wt % Si-g-PE; (ii) from 1 wt %, or 5 wt %, or 10 wt %, or 15 wt %, or 20 wt %, or 25 wt % to 30 wt %, or 35 wt %, or 40 wt %, or 45 wt %, or 50 wt %, or 55 wt % ethylene plastomer or elastomer (e.g., an ethylene/$C_4$-$C_8$ α-olefin copolymer); (iii) from 1 wt %, or 5 wt % to 10 wt %, or 15 wt %, or 20 wt %, or 25 wt %, or 30 wt %, or 35 wt %, or 40 wt %, or 45 wt %, or 50 wt %, or 55 wt % MAH-grafted ethylene/$C_4$-$C_8$ α-olefin copolymer; and (iv) from 0.1 wt %, or 0.5 wt %, or 0.8 wt % to 1.0 wt %, or 5 wt %, or 10 wt %, or 15 wt %, or 20 wt %, or 25 wt %, or 30 wt %, or 35 wt %, or 40 wt %, or 45 wt %, or 50 wt %, or 55 wt % LDPE, based on the total weight of the polymeric blend.

In an embodiment, the composition includes a polymeric blend containing, consisting essentially of, or consisting of (i) Si-g-PE, (ii) a first ethylene-based polymer, (iii) optionally, a second ethylene-based polymer, (iv) optionally, a third ethylene-based polymer, (v) optionally, a fourth ethylene-based polymer, and (vi) optionally, a fifth ethylene-based polymer. The ethylene-based polymers are different than the Si-g-PE because the ethylene-based polymers are not silane functionalized. Each ethylene-based polymer is compositionally, structurally, and/or physically different than the other ethylene-based polymers present in the composition. In other words, the first ethylene-based polymer is compositionally, structurally, and/or physically different than each of the second ethylene-based polymer, the third ethylene-based polymer, the fourth ethylene-based polymer, and the fifth ethylene-based polymer.

The silane functionalized polyolefin may comprise two or more embodiments disclosed herein.

B. Flame Retardant

The present composition includes a flame retardant. A "flame retardant" is a compound that inhibits or delays the spread of fire by suppressing combustion reactions. Nonlimiting examples of suitable flame retardants include halogen-free flame retardants, halogenated flame retardants, and combinations thereof.

In an embodiment, the composition includes a halogenated flame retardant. A "halogenated flame retardant" is a flame retardant compound that contains at least one halogen atom. A nonlimiting example of a suitable halogenated flame retardant is a brominated flame retardant such as decabromodiphenylethane (e.g., Saytex™ 8010, available from Albemarle Corporation), brominated polyphenyl ether (e.g., Emerald Innovation™ 1000, available from Great Lakes Solutions), and brominated styrene/butadiene block copolymer (e.g., Emerald Innovation™ 3000, available from LANXESS, which has a Mw greater than 100,000 g/mol). In an embodiment, an inorganic flame retardant synergist (such as antimony trioxide, zinc oxide, zinc stearate, and combinations thereof) is included in combination with the halogenated flame retardant.

In an embodiment, the composition includes a halogen-free flame retardant. Nonlimiting examples of suitable halogen-free flame retardants include metal hydrates, silica, glass powder, metal carbonate, antimony trioxide, and combinations thereof. In an embodiment, the halogen-free flame retardant is a metal hydrate. A nonlimiting example of a suitable metal hydrate is magnesium hydroxide.

In an embodiment, the composition contains from 20 wt %, or 25 wt %, or 30 wt %, or 35 wt %, or 40 wt % to 42 wt %, or 45 wt %, or 50 wt %, or 55 wt %, or 60 wt %, or 65 wt %, or 70 wt %, or 75 wt %, or 80 wt % of the halogen-free flame retardant, based on the total weight of the composition.

In an embodiment, the composition contains from 5 wt %, or 10 wt %, or 15 wt %, or 20 wt %, or 25 wt % to 30 wt %, or 35 wt %, or 40 wt %, or 45 wt %, or 50 wt %, or 55 wt %, or 60 wt %, or 65 wt %, or 70 wt % halogenated flame retardant, based on the total weight of the composition.

In an embodiment, the composition contains from 5 wt %, or 10 wt %, or 15 wt %, or 20 wt %, or 25 wt % to 30 wt %, or 35 wt %, or 40 wt %, or 45 wt %, or 50 wt %, or 55 wt %, or 60 wt %, or 65 wt %, or 70 wt % inorganic flame retardant synergist, based on the total weight of the composition.

In an embodiment, the weight ratio of halogenated flame retardant to inorganic flame retardant synergist is from 0.5:1 to 5:1, or from 0.7:1 to 4:1, or from 1:1 to 3:1.

The flame retardant may comprise two or more embodiments disclosed herein.

C. Hindered Amine Light Stabilizer (HALS)

The present composition includes a hindered amine light stabilizer (HALS) having a weight average molecular weight, Mw, greater than 5,000 Dalton (g/mol).

In an embodiment, the HALS has a Mw greater than 5,000 Dalton, or greater than 7,500 Dalton, or greater than 10,000 Dalton. In an embodiment, the HALS has a Mw from greater than 5,000 Dalton to 50,000 Dalton. In another embodiment, the HALS has a Mw from 5,500 Dalton, or 6,000 Dalton, or 7,000 Dalton, or 7,500 Dalton, or 8,000 Dalton, or 10,000 Dalton, or 11,000 Dalton, or 11,500 Dalton to 12,000 Dalton, or 13,000 Dalton, or 15,000 Dalton, or 20,000 Dalton, or 25,000 Dalton, or 30,000 Dalton, or 35,000 Dalton, or 40,000 Dalton, or 45,000 Dalton, or 50,000 Dalton. In another embodiment, the HALS has a Mw from 5,500 Dalton to 50,000 Dalton, or from 6,000 Dalton to 20,000 Dalton, or from 10,000 Dalton to 15,000 Dalton, or from 11,000 Dalton to 15,000 Dalton.

In an embodiment, the HALS with a Mw greater than 5,000 Dalton is a polymeric HALS. A "polymeric HALS" is a HALS with repeating monomeric units as shown in the following Structure (B):

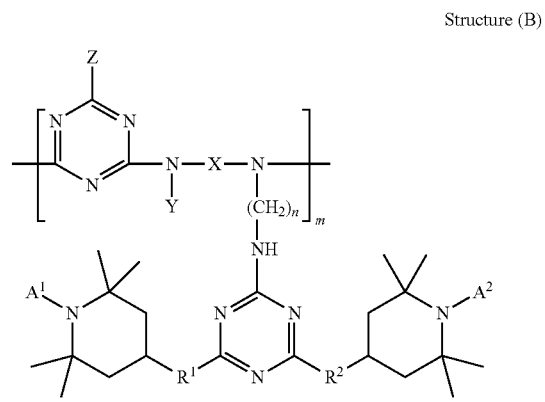

Structure (B)

wherein m is an integer from 3 to 20;

n is an integer from 2 to 12;

$A^1$ and $A^2$ each is independently selected from hydrogen, linear and branched $C_1$-$C_{12}$ alkyl groups, $C_3$-$C_8$ alkenyl groups, and $C_7$-$C_{19}$ aralkyl groups;

$R^1$ and $R^2$ each is independently selected from oxygen and a group of Structure (C):

Structure (C)

$A^3$ is selected from hydrogen, linear and branched $C_1$-$C_{12}$ alkyl groups, $C_5$-$C_{12}$ cycloalkyl groups, and $C_7$-$C_{19}$ aralkyl groups;

X is a —$(CH_2)_p$— group, wherein p is an integer from 2 to 12, with the proviso that p is a different integer than n;

Y is selected from $C_1$-$C_{18}$ alkyl groups, a group of Structure (D), and a group of Structure (E):

Structure (D)

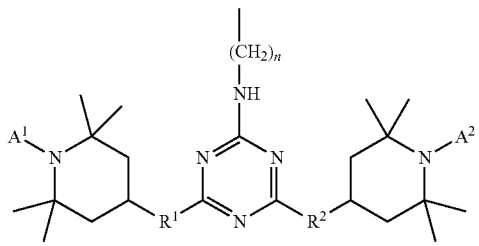

Structure (E)

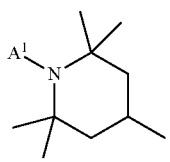

Z is selected from an O-$A^4$ group, a S-$A^4$ group, and a group of Structure (F):

Structure (F)

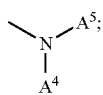

and $A^4$ and $A^5$ each is independently selected from hydrogen; linear and branched $C_1$-$C_{18}$ alkyl groups; $C_5$-$C_{12}$ cycloalkyl groups; $C_7$-$C_{12}$ aralkyl groups; $C_6$-$C_{12}$ aryl groups; or may form, together with the nitrogen atom to which they are linked, a $C_5$-$C_7$ heterocycle; and a piperidine group of Structure (G):

Structure (G)

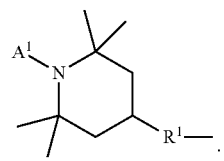

In Structure (B), m refers to the number of repeating units of the piperidine compound.

In an embodiment, the HALS has the Structure (B), wherein: m is an integer from 3 to 20; n is an integer from 3 to 12; $A^1$ and $A^2$ each is hydrogen; $R^1$ and $R^2$ each is a group of Structure (C); $A^3$ is a linear $C_4$ alkyl group; X is a —$(CH_2)_2$— group; Y is a group of Structure (D); Z is a group of Structure (F); and $A^4$ and $A^5$ each is a piperidine group of Structure (G).

In an embodiment, the HALS with a Mw greater than 5,000 Dalton has the following Structure (H):

Structure (H)

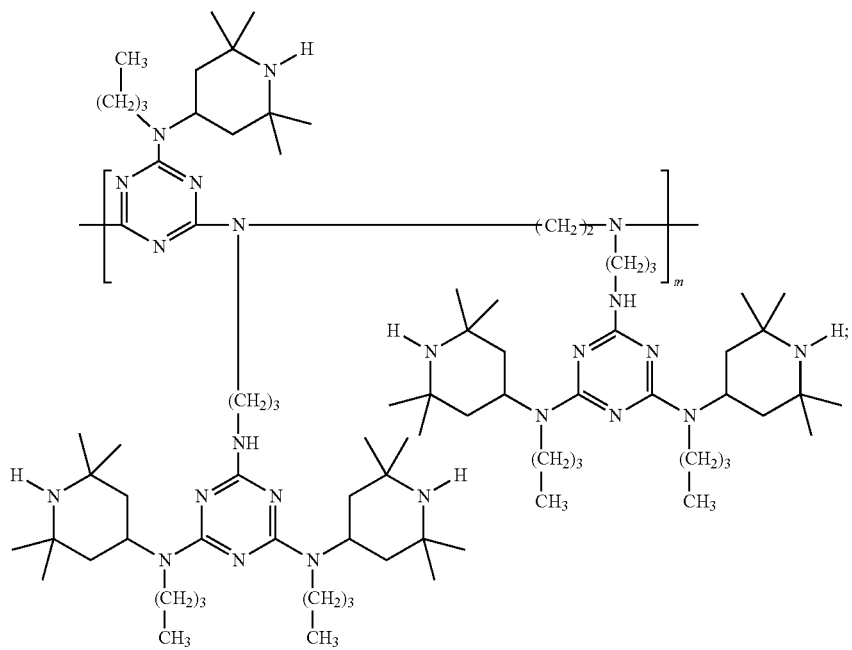

wherein m is an integer from 3 to 20.

A nonlimiting example of a suitable HALS having the Structure (H) is UVASORB™ HA10 (CAS 136504-96-6), available from 3V Sigma USA. UVASORB™ HA10 has a Mw of 11,600 Dalton.

In an embodiment, the HALS with a Mw greater than 5,000 Dalton is a poly(styryl-co-styryl isocyanate) having a HALS functional group bonded to the terminal isocyanate chain end, as described in Singh, R. P. et al, Journal of Applied Polymer Science, Vol. 90, 1126-1138 (2003), the entire contents of which are herein incorporated by reference.

In an embodiment, the composition contains from 0.10 wt %, or 0.15 wt %, or 0.20 wt % to 0.25 wt %, or 0.30 wt %, or 0.35 wt %, or 0.40 wt %, or 0.45 wt %, or 0.50 wt % HALS having a Mw greater than 5,000 Dalton, based on the total weight of the composition.

The HALS may comprise two or more embodiments disclosed herein.

D. Additives

The present composition may include one or more additives. Nonlimiting examples of suitable additives include antioxidants, colorants, corrosion inhibitors, lubricants, silanol condensation catalysts, ultra violet (UV) absorbers or stabilizers, anti-blocking agents, coupling agents, compatibilizers, plasticizers, fillers, processing aids, moisture scavengers, scorch retardants, metal deactivators, siloxanes, and combinations thereof.

In an embodiment, the composition includes an antioxidant. "Antioxidant" refers to types or classes of chemical compounds that are capable of being used to minimize the oxidation that can occur during the processing of polymers. Nonlimiting examples of suitable antioxidants include high molecular weight hindered phenols and multifunctional phenols such as sulfur and phosphorous-containing phenol. A nonlimiting example of a suitable hindered phenol is pentaerythritol tetrakis(3-(3,5-di-tert-butyl-4-hydroxyphenyl) propionate), commercially available as Irganox© 1010 from BASF. In an embodiment, the composition contains from 0 wt %, or 0.001 wt %, or 0.01 wt %, or 0.02 wt %, or 0.05 wt %, or 0.1 wt %, or 0.2 wt %, or 0.3 wt % to 0.4 wt %, or 0.5 wt %, or 0.6 wt %, or 0.7 wt %, or 0.8 wt %, or 1.0 wt %, or 2.0 wt %, or 2.5 wt %, or 3.0 wt % antioxidant, based on total weight of the composition.

In an embodiment, the composition includes silanol condensation catalyst, such as Lewis and Brønsted acids and bases. A "silanol condensation catalyst" promotes crosslinking of the silane functionalized polyolefin. Lewis acids are chemical species that can accept an electron pair from a Lewis base. Lewis bases are chemical species that can donate an electron pair to a Lewis acid.

Nonlimiting examples of suitable Lewis acids include the tin carboxylates such as dibutyl tin dilaurate (DBTDL), and various other organo-metal compounds such as lead naphthenate, zinc caprylate and cobalt naphthenate. Nonlimiting examples of suitable Lewis bases include the primary, secondary and tertiary amines. These catalysts are typically used in moisture cure applications. In an embodiment, the composition includes from 0 wt %, or 0.001 wt %, or 0.005 wt %, or 0.01 wt %, or 0.02 wt %, or 0.03 wt % to 0.05 wt %, or 0.1 wt %, or 0.2 wt %, or 0.5 wt %, or 1.0 wt % silanol condensation catalyst, based on the total weight of the composition. During the MONOSIL™ process, the silanol condensation catalyst is typically added to the reaction-extruder so that it is present during the grafting reaction of silane to the polyolefin backbone to form the in situ Si-g-PO. As such, the silane functionalized polyolefin may experience some coupling (light crosslinking) before it leaves the extruder with the completion of the crosslinking after it has left the extruder, typically upon exposure to moisture (e.g., a sauna bath or a cooling bath) and/or the humidity present in the environment in which it is stored, transported or used.

In an embodiment, the silanol condensation catalyst is included in a catalyst masterbatch blend, and the catalyst masterbatch is included in the composition. Nonlimiting examples of suitable catalyst masterbatches include those sold under the trade name SI-LINK™ from The Dow Chemical Company, including SI-LINK™ DFDA-5481 Natural. SI-LINK™ DFDA-5481 Natural is a catalyst masterbatch containing a blend of 1-butene/ethene polymer, ethene homopolymer, phenolic compound antioxidant, dibutyltin dilaurate (DBTDL) (a silanol condensation catalyst), and a phenolic hydrazide compound. In an embodiment, the composition contains from 0 wt %, or 0.001 wt %, or 0.01 wt %, or 0.1 wt %, or 0.3 wt %, or 0.5 wt %, or 1.0 wt %, or 2.0 wt %, or 3.0 wt %, or 4.0 wt % to 5.0 wt %, or 6.0 wt %, or 7.0 wt %, or 8.0 wt %, or 9.0 wt %, or 10.0 wt % silanol condensation catalyst or catalyst masterbatch, based on total weight of the composition.

In an embodiment, the composition includes an ultraviolet (UV) absorber or stabilizer that is compositionally and/or structurally distinct from the HALS having an Mw greater than 5,000 Dalton. A nonlimiting example of a suitable UV stabilizer is a HALS having a Mw less than 5,000 Dalton, such as 1,3,5-Triazine-2,4,6-triamine, N,N-1,2-ethanediyl-bisN-3-4,6-bisbutyl(1,2,2,6,6-pentamethyl-4-piperidinyl) amino-1,3,5-triazin-2-ylaminopropyl-N,N-dibutyl-N,N-bis (1,2,2,6,6-pentamethyl-4-piperidinyl)-1,5,8,12-tetrakis[4,6-bis(n-butyl-n-1,2,2,6,6-pentamethyl-4-piperidylamino)-1,3, 5-triazin-2-yl]-1,5,8,12-tetraazadodecane, which is commercially available as SABO™ STAB UV-119 from SABO S.p.A. of Levate, Italy. In an embodiment, the composition contains from 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, or 1.0 wt %, or 2.0 wt %, or 2.5 wt %, or 3.0 wt % UV absorber or stabilizer, based on total weight of the composition.

In an embodiment, the composition excludes HALS having a Mw less than 5,000 Dalton.

In an embodiment, the composition includes a metal deactivator. Metal deactivators suppress the catalytic action of metal surfaces and traces of metallic minerals. Metal deactivators convert the traces of metal and metal surfaces into an inactive form, e.g., by sequestering. Non-limiting examples of suitable metal deactivators include 1,2-bis(3,5-di-tert-butyl-4-hydroxyhydrocinnamoyl)hydrazine, 2,2'-oxamindo bis[ethyl 3-(3,5-di-tert-butyl-4-hydroxyphenyl) propionate], and oxalyl bis(benzylidenehydrazide) (OABH). The metal deactivator is present in an amount from 0 wt %, or greater than 0 wt %, or 0.01 wt %, or 0.02 wt %, or 0.03 wt %, or 0.04 wt % to 0.05 wt %, or 0.1 wt %, or 0.5 wt %, or 1 wt %, or 2 wt %, or 3 wt %, or 5 wt %, or 8 wt %, or 10 wt %, based on the total weight of the composition.

In an embodiment, the composition includes a filler. Nonlimiting examples of suitable fillers include zinc oxide, zinc borate, zinc molybdate, zinc sulfide, carbon black, organo-clay, and combinations thereof. The filler may or may not have flame retardant properties. In an embodiment, the filler is coated with a material (such as stearic acid) that will prevent or retard any tendency that the filler might otherwise have to interfere with the silane cure reaction. In an embodiment, the composition contains from 0 wt %, or 0.01 wt %, or 0.02 wt %, or 0.05 wt %, or 0.1 wt %, or 0.2 wt %, or 0.4 wt % to 0.5 wt %, or 0.6 wt %, or 0.8 wt %, or 1.0 wt %, or 2.0 wt %, or 2.5 wt %, or 3.0 wt %, or 5.0 wt %, or 8.0 wt %, or 10.0 wt %, or 20 wt % filler, based on total weight of the composition.

In an embodiment, the composition includes a processing aid. Nonlimiting examples of suitable processing aids include oils, organic acids (such as stearic acid), and metal salts of organic acids (such as zinc stearate). In an embodiment, the composition contains from 0 wt %, or 0.01 wt %, or 0.02 wt %, or 0.05 wt %, or 0.1 wt %, or 0.2 wt %, or 0.3 wt %, or 0.4 wt % to 0.5 wt %, or 0.6 wt %, or 0.7 wt %, or 1.0 wt %, or 2.0 wt %, or 2.5 wt %, or 3.0 wt % processing aid, based on total weight of the composition.

In an embodiment, the composition includes a moisture scavenger. Moisture scavengers remove or deactivate unwanted water in the composition to prevent unwanted (premature) crosslinking and other water-initiated reactions in the composition during storage or at extrusion conditions. Non-limiting examples of moisture scavengers include organic compounds selected from ortho esters, acetals, ketals or silanes such as alkoxysilanes. In an embodiment, the moisture scavenger is an alkoxy silane (e.g., hexadecyltrimethoxysilane, octyltrimethoxysilane, or octyltriethoxysilane). The alkoxy silane moisture scavenger is not grafted to a polyolefin or copolymerized with an olefin such as ethylene. The moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt % to 0.2 wt %, or 0.3 wt %, or 0.5 wt %, or 0.75 wt %, or 1.0 wt %, or 1.5 wt %, or 2.0 wt %, or 3.0 wt %, based on the total weight of the composition.

In an embodiment, the composition includes a siloxane. A nonlimiting example of a suitable siloxane is a polydimethylsiloxane (PDMS). A nonlimiting example of a suitable PDMS is dimethylvinylsilyl terminated polydimethylsiloxane. In an embodiment, PDMS is included in a PDMS masterbatch blend, and the PDMS masterbatch is included in the composition. A nonlimiting example of a suitable PDMS masterbatch is MB50-002 Masterbatch, available from Dow Corning. MB50-002 Masterbatch includes 50 wt % dimethylvinylsilyl terminated PDMS dispersed in LDPE, based on the total weight of the masterbatch. In an embodiment, the composition contains from 0.2 wt %, or 0.5 wt %, or 0.8 wt % to 1.0 wt %, or 1.5 wt %, or 2.0 wt %, or 2.5 wt %, or 3.0 wt %, or 5.0 wt % siloxane, based on the total weight of the composition. In another embodiment, the composition contains from 0.5 wt %, or 1.0 wt %, or 1.5 wt %, or 1.8 wt % to 2.0 wt %, or 2.5 wt %, or 3.0 wt %, or 5.0 wt % PDMS masterbatch, based on the total weight of the composition.

In an embodiment, the composition includes an additive selected from a silanol condensation catalyst (which may be included in a catalyst masterbatch blend), a moisture scavenger (e.g., hexadecyltrimethoxysilane), an antioxidant (e.g., pentaerythritol tetrakis(3-(3,5-di-tert-butyl-4-hydroxyphenyl)propionate)), a metal deactivator (e.g., OABH), a siloxane (e.g., a PDMS, which may be included in a PDMS masterbatch blend), and combinations thereof.

In an embodiment, the composition contains from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, or 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition.

The additive may comprise two or more embodiments disclosed herein.

E. Composition

In an embodiment, the composition includes: (A) a silane functionalized polyolefin (e.g., a silane functionalized polyethylene); (B) a halogen-free flame retardant (e.g., magnesium hydroxide); (C) a hindered amine light stabilizer (HALS) having a Mw greater than 5,000 Dalton; (D) optional additive.

The silane functionalized polyolefin; halogen-free flame retardant; HALS having a Mw greater than 5,000 Dalton; and optional additive may be any respective silane functionalized polyolefin; halogen-free flame retardant; HALS having a Mw greater than 5,000 Dalton; and optional additive disclosed herein.

In an embodiment, the composition contains, consists essentially of, or consists of: (A) from 20 wt %, or 25 wt %, or 30 wt %, or 35 wt % to 36 wt %, or 40 wt %, or 45 wt %, or 50 wt %, or 55 wt %, or 60 wt %, or 65 wt %, or 70 wt %, or 75 wt %, or 80 wt % silane functionalized polyolefin; (b) from 20 wt %, or 25 wt %, or 30 wt %, or 35 wt %, or 40 wt % to 42 wt %, or 45 wt %, or 50 wt %, or 55 wt %, or 60 wt %, or 65 wt %, or 70 wt %, or 75 wt %, or 80 wt % halogen-free flame retardant; (c) from 0.10 wt %, or 0.15 wt %, or 0.20 wt % to 0.25 wt %, or 0.30 wt %, or 0.35 wt %, or 0.40 wt %, or 0.45 wt %, or 0.50 wt % HALS having a Mw greater than 5,000 Dalton; and (d) from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, or 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 10.0 wt %, or 15.0 wt %, or 20.0 wt % additive.

It is understood that the sum of the components in each of the foregoing compositions yields 100 weight percent (wt %).

In an embodiment, the composition yields a wet insulation resistance (IR) greater than 500 megaohm/3.048 meter (Mohm/3.048 m), or greater than 600 Mohm/3.048 m, or greater than 700 Mohm/3.048 m at 90° C. from 6 hours to 7 weeks, or from 6 hours to 9 weeks, or from 6 hours to 12 weeks, or from 6 hours to 24 weeks, or from 6 hours to 36 weeks.

In an embodiment, the composition yields a wet insulation resistance (IR) greater than 800 Mohm/3.048 m, or greater than 1,000 Mohm/3.048 m, or greater than 1,300 Mohm/3.048 m, or greater than 1,500 Mohm/3.048 m at 90° C. from 6 hours to 7 weeks, or from 6 hours to 9 weeks, or from 6 hours to 12 weeks, or from 6 hours to 24 weeks, or from 6 hours to 36 weeks. In another embodiment, the composition yields a wet IR from 800 Mohm/3.048 m, or 1,000 Mohm/3.048 m, or 1,300 Mohm/3.048 m, or 1,500 Mohm/3.048 m to 2,000 Mohm/3.048 m, or 3.00 Mohm/3.048 m, or 4,000 Mohm/3.048 m, or 5,000 Mohm/3.048 m, or 10,000 Mohm/3.048 m, or 15,000 Mohm/3.048 m, or 20,000 Mohm/3.048 m, or 30,000 Mohm/3.048 m, or 40,000 Mohm/3.048 m, or 50,000 Mohm/3.048 m at 90° C. from 6 hours to 7 weeks, or from 6 hours to 9 weeks, or from 6 hours to 12 weeks, or from 6 hours to 24 weeks, or from 6 hours to 36 weeks.

In an embodiment, the composition yields a wet IR ratio from 0.4, or 0.5, or 0.6, or 0.7, or 0.8, or 0.9, or 1.0 to 1.1, or 1.5, or 2.0, or 3.0, or 5.0, or 10, or 15, or 20.

In an embodiment, the composition has a tensile stress at break from 500 psi (3.45 megaPascal (MPa)), or 700 psi (4.83 MPa), or 1,000 psi (6.90 MPa), or 1,300 psi (8.96 MPa), or 1,500 psi (10.34 MPa), or 2,000 psi (13.79 MPa), or 2,100 psi (14.48 MPa) to 2,200 psi (15.17 MPa), or 2,500 psi (17.24 MPa), or 3,000 psi (20.68 MPa), or 4,000 psi (27.58 MPa), or 5,000 psi (34.47 MPa).

In an embodiment, the composition has a tensile elongation at break from 100%, or 125%, or 150%, or 200%, or 250%, or 300%, or 400%, or 430% to 440%, or 450%, or 500%, or 600%, or 700%, or 800%.

In an embodiment, the composition yields a crush resistance from 800 lb-f (362.81 kg-f), or 1,000 lb-f (453.51 kg-f), or 1,200 lb-f (544.22 kg-f), or 1,500 lb-f (680.27 kg-f), or 1,520 lb-f (689.34 kg-f) to 1,550 lb-f (702.95 kg-f), or 1,600 lb-f (725.62 kg-f), or 2,000 lb-f (907.03 kg-f), or 2,500 lb-f (1133.79 kg-f), or 3,000 lb-f (1360.54 kg-f).

In an embodiment, the composition has a hot creep from 0%, or 1%, or 2%, or 5%, or 10%, or 15%, or 20%, or 25%, or 30%, or 35% to 40%, or 50%, or 60%, or 70%, or 75%, or 80%, or 90%, or 100%, or 150%, or 170% at 0.2 MPa and 150° C.

In an embodiment, the composition yields a retained dielectric strength (retained ACBD) after glancing impact from 20%, or 25%, or 30%, or 35%, or 40%, or 45%, or 50%, or 55%, or 60%, or 65%, or 70%, or 75%, or 80%, or 85%, or 90%, or 95% to 100%; or from 20% to 100%, or from 75% to 100%.

In an embodiment, the composition is halogen-free.

In an embodiment, the composition contains, consists essentially of, or consists of: (A) from 20 wt %, or 25 wt %, or 30 wt %, or 35 wt % to 36 wt %, or 40 wt %, or 45 wt %, or 50 wt %, or 55 wt %, or 60 wt %, or 65 wt %, or 70 wt %, or 75 wt %, or 80 wt % silane functionalized polyolefin (e.g., a Si-g-PE); (B) from 20 wt %, or 25 wt %, or 30 wt %, or 35 wt %, or 40 wt % to 42 wt %, or 45 wt %, or 50 wt %, or 55 wt %, or 60 wt %, or 65 wt %, or 70 wt %, or 75 wt %, or 80 wt % halogen-free flame retardant (e.g., a metal hydroxide); (C) from 0.10 wt %, or 0.15 wt %, or 0.20 wt % to 0.25 wt %, or 0.30 wt %, or 0.35 wt %, or 0.40 wt %, or 0.45 wt %, or 0.50 wt % HALS having a Mw greater than 5,000 Dalton (e.g., of Structure (H)); and (D) from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, or 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive; and the composition or coated conductor has one, some, or all of the following properties: (i) a wet IR from 500 Mohm/3.048 m, or 800 Mohm/3.048 m, or 1,000 Mohm/3.048 m, or 1,500 Mohm/3.048 m to 5,000 Mohm/3.048 m, or 10,000 Mohm/3.048 m, or 15,000 Mohm/3.048 m, or 20,000 Mohm/3.048 m, or 30,000 Mohm/3.048 m, or 50,000 Mohm/3.048 m at 90° C. from 6 hours to 24 weeks; and/or (ii) a wet IR ratio from 0.4, or 0.5, or 0.6, or 0.7, or 0.8, or 0.9, or 1.0 to 1.1, or 1.5, or 2.0, or 3.0, or 5.0; and/or (iii) a tensile stress at break from 1,000 psi (6.90 MPa), or 2,000 psi (13.79 MPa), or 2,100 psi (14.48 MPa) to 2,200 psi (15.17 MPa), or 2,500 psi (17.24 MPa), or 3,000 psi (20.68 MPa), or 4,000 psi (27.58 MPa), or 5,000 psi (34.47 MPa); and/or (iv) a tensile elongation at break from 100%, or 300%, or 400%, or 430% to 440%, or 450%, or 500%, or 600%, or 700%, or 800%; and/or (v) a crush resistance from 1,000 lb-f (453.51 kg-f), or 1,500 lb-f (680.27 kg-f), or 1,520 lb-f (689.34 kg-f) to 1,550 lb-f (702.95 kg-f), or 1,600 lb-f (725.62 kg-f), or 2,000 lb-f (907.03 kg-f), or 2,500 lb-f (1133.79 kg-f), or 3,000 lb-f (1360.54 kg-f); and/or (vi) a hot creep from 10%, or 15%, or 20%, or 25%, or 30%, or 35% to 40%, or 50%, or 60%, or 70%, or 75%, or 80% at 0.2 MPa and 150° C.; and/or (vii) a retained ACBD after glancing impact from 20%, or 25%, or 30%, or 35%, or 40%, or 45%, or 50%, or 55%, or 60%, or 65%, or 70%, or 75%, or 80%, or 85%, or 90%, or 95% to 100%; and/or (viii) the composition is halogen-free.

In an embodiment, the composition contains, consists essentially of, or consists of: (A) from 20 wt %, or 25 wt %, or 30 wt %, or 35 wt % to 36 wt %, or 40 wt %, or 45 wt %, or 50 wt %, or 55 wt %, or 60 wt %, or 65 wt %, or 70 wt %, or 75 wt %, or 90 wt % silane functionalized polyolefin (e.g., a Si-g-PE); (B) from 5 wt %, or 10 wt %, or 15 wt %, or 20 wt %, or 25 wt % to 30 wt %, or 35 wt %, or 40 wt %, or 45 wt %, or 50 wt %, or 55 wt %, or 60 wt %, or 65 wt %, or 70 wt % halogenated flame retardant; (C) from 5 wt %, or 10 wt %, or 15 wt %, or 20 wt %, or 25 wt % to 30 wt %, or 35 wt %, or 40 wt %, or 45 wt %, or 50 wt %, or 55 wt %, or 60 wt %, or 65 wt %, or 70 wt % inorganic flame retardant synergist; (D) from 0.10 wt %, or 0.15 wt %, or 0.20 wt % to 0.25 wt %, or 0.30 wt %, or 0.35 wt %, or 0.40 wt %, or 0.45 wt %, or 0.50 wt % HALS having a Mw greater than 5,000 Dalton (e.g., of Structure (H)); and (E) from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, or 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive; and the composition or coated conductor has one, some, or all of the following properties: (i) a wet IR from 500 Mohm/3.048 meter, or 800 Mohm/3.048 meter, or 1,000 Mohm/3.048 meter, or 1,500 Mohm/3.048 meter to 5,000 Mohm/3.048 meter, or 10,000 Mohm/3.048 meter, or 15,000 Mohm/3.048 meter, or 20,000 Mohm/3.048 meter, or 30,000 Mohm/3.048 meter, or 50,000 Mohm/3.048 meter at 90° C. from 6 hours to 24 weeks; and/or (ii) a wet IR ratio from 0.4, or 0.5, or 0.6, or 0.7, or 0.8, or 0.9, or 1.0 to 1.1, or 1.5, or 2.0, or 3.0, or 5.0; and/or (iii) a tensile stress at break from 1,000 psi (6.90 MPa), or 2,000 psi (13.79 MPa), or 2,100 psi (14.48 MPa) to 2,200 psi (15.17 MPa), or 2,500 psi (17.24 MPa), or 3,000 psi (20.68 MPa), or 4,000 psi (27.58 MPa), or 5,000 psi (34.47 MPa); and/or (iv) a tensile elongation at break from 100%, or 300%, or 400%, or 430% to 440%, or 450%, or 500%, or 600%, or 700%, or 800%; and/or (v) a crush resistance from 1,000 lb-f (453.51 kg-f), or 1,500 lb-f (680.27 kg-f), or 1,520 lb-f (689.34 kg-f) to 1,550 lb-f (702.95 kg-f), or 1,600 lb-f (725.62 kg-f), or 2,000 lb-f (907.03 kg-f), or 2,500 lb-f (1133.79 kg-f), or 3,000 lb-f (1360.54 kg-f); and/or (vi) a hot creep from 10%, or 15%, or 20%, or 25%, or 30%, or 35% to 40%, or 50%, or 60%, or 70%, or 75%, or 80% at 0.2 MPa and 150° C.; and/or (vii) a retained ACBD after glancing impact from 20%, or 25%, or 30%, or 35%, or 40%, or 45%, or 50%, or 55%, or 60%, or 65%, or 70%, or 75%, or 80%, or 85%, or 90%, or 95% to 100%.

In an embodiment, the composition is moisture-curable. In another embodiment, the composition is crosslinked.

The composition may comprise two or more embodiments disclosed herein.

F. Coated Conductor

The present disclosure also provides a coated conductor. The coated conductor includes a conductor and a coating on the conductor, the coating including a composition. The composition includes a silane functionalized polyolefin; a flame retardant (e.g., a halogen-free flame retardant); a HALS having a Mw greater than 5,000 Dalton; and optional additive.

The composition may be any composition disclosed herein. The silane functionalized polyolefin, flame retardant, HALS having a Mw greater than 5,000 Dalton, and optional additive may be any respective silane functionalized polyolefin, flame retardant, HALS having a Mw greater than 5,000 Dalton, and optional additive disclosed herein.

In an embodiment, the coating is an insulation sheath for a conductor. In another embodiment, the coating is a jacket for a conductor.

The process for producing a coated conductor includes heating the present composition to at least the melting temperature of the silane functionalized polyolefin, and then extruding the polymeric melt blend onto the conductor. The term "onto" includes direct contact or indirect contact between the polymeric melt blend and the conductor. The polymeric melt blend is in an extrudable state.

The coating is located on the conductor. The coating may be one or more inner layers such as an insulating layer. The coating may wholly or partially cover or otherwise surround or encase the conductor. The coating may be the sole component surrounding the conductor. When the coating is the sole component surrounding the conductor, the coating may serve as a jacket and/or an insulation. In an embodiment, the coating is the outermost layer on the coated conductor. Alternatively, the coating may be one layer of a multilayer jacket or sheath encasing the metal conductor. In an embodiment, the coating directly contacts the conductor. In another embodiment, the coating directly contacts an insulation layer surrounding the conductor.

In an embodiment, the coating directly contacts the conductor. The term "directly contacts," as used herein, is a coating configuration whereby the coating is located immediately adjacent to the conductor, the coating touches the conductor, and no intervening layers, no intervening coatings, and/or no intervening structures, are present between the coating and the conductor.

In another embodiment, the coating indirectly contacts the conductor. The term "indirectly contacts," as used herein, is a coating configuration whereby an intervening layer, an intervening coating, or an intervening structure, is present between the coating and the conductor. Nonlimiting examples of suitable intervening layers, intervening coatings, and intervening structures include insulation layers, moisture barrier layers, buffer tubes, and combinations thereof. Nonlimiting examples of suitable insulation layers include foamed insulation layers, thermoplastic insulation layers, crosslinked insulation layers, and combinations thereof.

The coating is crosslinked. In an embodiment, crosslinking of the present composition begins in the extruder, but only to a minimal extent. In another embodiment, crosslinking is delayed until the composition is extruded upon the conductor. Crosslinking of the present composition can be initiated and/or accelerated through exposure to humid environment (e.g., ambient conditions or cure in a sauna or water bath), and/or the application of heat (including when peroxides are used for crosslinking) or radiation. In an embodiment, after extrusion, the coated conductor is conditioned at humid conditions to cause crosslinking of the polymer layers and yield suitably low hot creep values (i.e., from 10% to 80%, or from 5% to 175%, measured at 150° C. or 200° C.).

In an embodiment, the coated conductor passes the horizontal burn test. To pass the horizontal burn test, the coated conductor must have a total char length of less than 100 mm and cotton placed underneath must not be ignited.

In an embodiment, the coated conductor has a wet IR greater than greater than 500 Mohm/3.048 m, or greater than 600 Mohm/3.048 m, or greater than 700 Mohm/3.048 m at 90° C. from 6 hours to 7 weeks, or from 6 hours to 9 weeks, or from 6 hours to 12 weeks, or from 6 hours to 24 weeks, or from 6 hours to 36 weeks.

In an embodiment, the coated conductor has a wet IR greater than greater than 800 Mohm/3.048 m, or greater than 1,000 Mohm/3.048 m, or greater than 1,300 Mohm/3.048 m, or greater than 1,500 Mohm/3.048 m at 90° C. from 6 hours to 7 weeks, or from 6 hours to 9 weeks, or from 6 hours to 12 weeks, or from 6 hours to 24 weeks, or from 6 hours to 36 weeks. In another embodiment, the coated conductor has a wet IR from 800 Mohm/3.048 m, or 1,000 Mohm/3.048 m, or 1,300 Mohm/3.048 m, or 1,500 Mohm/3.048 m to 2,000 Mohm/3.048 m, or 3.00 Mohm/3.048 m, or 4,000 Mohm/3.048 m, or 5,000 Mohm/3.048 m, or 10,000 Mohm/3.048 m, or 15,000 Mohm/3.048 m, or 20,000 Mohm/3.048 m, or 30,000 Mohm/3.048 m, or 40,000 Mohm/3.048 m, or 50,000 Mohm/3.048 m at 90° C. from 6 hours to 7 weeks, or from 6 hours to 9 weeks, or from 6 hours to 12 weeks, or from 6 hours to 24 weeks, or from 6 hours to 36 weeks.

In an embodiment, the coated conductor has a wet IR ratio from 0.4, or 0.5, or 0.6, or 0.7, or 0.8, or 0.9, or 1.0 to 1.1, or 1.5, or 2.0, or 3.0, or 5.0, or 10, or 15, or 20.

In an embodiment, the coated conductor is halogen-free.

In an embodiment, the coated conductor has a retained ACBD after glancing impact greater than 20%, or greater than 75%, or from 20%, or 25%, or 30%, or 35%, or 40%, or 45%, or 50%, or 55%, or 60%, or 65%, or 70%, or 75%, or 80%, or 85%, or 90%, or 95% to 100%; and the composition has one, some, or all, of the following properties: (i) a retained tensile strength after 7 days in an oven at 121° C. greater than 94%, or from 94%, or 94.5% to 100%; and/or (ii) a retained tensile elongation after 7 days in an oven at 121° C. greater than 87%, or from 87%, or 88% to 100%; and/or (iii) a retained tensile strength after 30 days in a weatherometer greater than 95%, or greater than 97%, or greater than 99%; and/or (iv) a retained tensile elongation after 30 days in a weatherometer greater than 81%, or from 81%, or 82% to 100%.

The coated conductor includes a conductor and a coating on the conductor, the coating including a composition. In an embodiment, the composition contains, consists essentially of, or consists of: (A) from 20 wt %, or 25 wt %, or 30 wt %, or 35 wt % to 36 wt %, or 40 wt %, or 45 wt %, or 50 wt %, or 55 wt %, or 60 wt %, or 65 wt %, or 70 wt %, or 75 wt %, or 80 wt % of the silane functionalized polyolefin (e.g., a Si-g-PE); (B) from 20 wt %, or 25 wt %, or 30 wt %, or 35 wt %, or 40 wt % to 42 wt %, or 45 wt %, or 50 wt %, or 55 wt %, or 60 wt %, or 65 wt %, or 70 wt %, or 75 wt %, or 80 wt % of the halogen-free flame retardant (e.g., a metal hydroxide); (C) from 0.10 wt %, or 0.15 wt %, or 0.20 wt % to 0.25 wt %, or 0.30 wt %, or 0.35 wt %, or 0.40 wt %, or 0.45 wt %, or 0.50 wt % HALS having a Mw greater than 5,000 Dalton (e.g., a HALS of Structure (H)); and (D) from 0 wt %, or greater than 0 wt %, or 0.001 wt %, or 0.005 wt %, to 0.007 wt %, or 0.009 wt %, or 0.01 wt %, or 0.1 wt %, or 0.2 wt %, or 0.5 wt %, or 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 10.0 wt %, or 15.0 wt %, or 20.0 wt % additive; and the coated conductor has one, some, or all of the following properties: (i) a wet IR from 800 Mohm/3.048 m, or 1,000 Mohm/3.048 m, or 1,500 Mohm/3.048 m to 5,000 Mohm/3.048 m, or 10,000 Mohm/3.048 m, or 15,000 Mohm/3.048 m, or 20,000 Mohm/3.048 m, or 30,000 Mohm/3.048 m, or 40,000 Mohm/3.048 m, or 50,000 Mohm/3.048 m at 90° C. from 0 to 24 weeks; and/or (ii) a wet IR ratio from 0.4, or 0.5, or 0.6, or 0.7, or 0.8, or 0.9, or 1.0 to 1.1, or 1.5, or 2.0, or 3.0, or 5.0; (iii) a crush resistance from 1,000 lb-f (453.51 kg-f), or 1,500 lb-f (680.27 kg-f), or 1,520 lb-f (689.34 kg-f) to 1,550 lb-f (702.95 kg-f), or 1,600 lb-f (725.62 kg-f), or 2,000 lb-f (907.03 kg-f), or 2,500 lb-f (1133.794 kg-f), or 3,000 lb-f (1360.54 kg-f); and/or (iv) the coated conductor passes the horizontal burn test; and/or (v) the coated conductor is halogen-free; and the composition has one, some, or all of the following properties: (1) a tensile stress at break from 1,000 psi (6.90 MPa), or 2,000 psi (13.79 MPa), or 2,100 psi (14.48 MPa) to 2,200 psi (15.17 MPa), or 2,500 psi (17.24 MPa), or 3,000 psi (20.68 MPa), or 4,000 psi (27.58 MPa), or 5,000 psi (34.47 MPa); and/or (2) a tensile elongation at break from 100%, or 300%, or 400%, or 430% to 440%, or 450%, or 500%, or 600%, or 700%, or 800%; and/or (3) a hot creep from 0%, or 1%, or 2%, or 5%, or 10%, or 15%, or 20%, or 25%, or 30%, or 35% to 40%, or 50%, or 60%, or 70%, or 75%, or 80%, or 90%, or 100%, or 150%, or 170% at 0.2 MPa and 150° C.

In an embodiment, the coating contains, consists essentially of, or consists of a composition that contains, consists essentially of, or consists of:
(A) from 20 wt %, or 30 wt %, or 40 wt %, or 50 wt % to 55 wt %, or 60 wt %, or 65 wt %, or 70 wt %, or 75 wt %, based on the total weight of the composition, of a polymeric blend containing, consisting essentially of, or consisting of: (i) from 50 wt %, or 55 wt %, or 60 wt %, or 65 wt % to 70 wt %, or 75 wt %, or 80 wt % silane-functionalized polyolefin (e.g., a Si-g-PE); (ii) from 1 wt %, or 5 wt %, or 10 wt %, or 15 wt %, or 20 wt %, or 25 wt % to 30 wt %, or 35 wt %, or 40 wt %, or 45 wt % of a first ethylene-based polymer (e.g., an ethylene plastomer or elastomer, such as an ethylene/$C_4$-$C_8$ α-olefin copolymer); (iii) from 1 wt %, or 5 wt % to 10 wt %, or 15 wt %, or 20 wt %, or 25 wt %, or 30 wt %, or 35 wt %, or 40 wt %, or 45 wt % of a second ethylene-based polymer (e.g., a MAH-grafted ethylene/$C_4$-$C_8$ α-olefin copolymer); and (iv) from 0.1 wt %, or 0.5 wt %, or 0.8 wt % to 1.0 wt %, or 5 wt %, or 10 wt %, or 15 wt %, or 20 wt %, or 25 wt %, or 30 wt %, or 35 wt %, or 40 wt %, or 45 wt % of a third ethylene-based polymer (e.g., an LDPE), based on the total weight of the polymeric blend, wherein each of the first ethylene-based polymer, the second ethylene-based polymer, and the third ethylene-based polymer is structurally, compositionally, and/or physically distinct;
(B) from 20 wt %, or 25 wt %, or 30 wt %, or 35 wt %, or 40 wt % to 42 wt %, or 45 wt %, or 50 wt %, or 55 wt %, or 60 wt %, or 65 wt %, or 70 wt %, or 75 wt %, or 80 wt % of the halogen-free flame retardant (e.g., a metal hydroxide);
(C) from 0.10 wt %, or 0.15 wt %, or 0.20 wt % to 0.25 wt %, or 0.30 wt %, or 0.35 wt %, or 0.40 wt %, or 0.45 wt %, or 0.50 wt % HALS having a Mw greater than 5,000 Dalton (e.g., a HALS of Structure (H)); and
(D) from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive; and the coated conductor has one, some, or all of the following properties: (i) a wet IR from 800 Mohm/3.048 m, or 1,000 Mohm/3.048 m, or 1,500 Mohm/3.048 m to 5,000 Mohm/3.048 m, or 10,000 Mohm/3.048 m, or 15,000 Mohm/3.048 m, or 20,000 Mohm/3.048 m, or 30,000 Mohm/3.048 m, or 50,000 Mohm/3.048 m at 90° C. from 0 to 24 weeks; and/or (ii) a wet IR ratio from 0.4, or 0.5, or 0.6, or 0.7, or 0.8, or 0.9, or 1.0 to 1.1, or 1.5, or 2.0, or 3.0, or 5.0; and/or (iii) a crush resistance from 1,000 lb-f (453.51 kg-f), or 1,500 lb-f (680.27 kg-f), or 1,520 lb-f (689.34 kg-f) to 1,550 lb-f (702.95 kg-f), or 1,600 lb-f (725.62 kg-f), or 2,000 lb-f (907.03 kg-f), or 2,500 lb-f (1133.794 kg-f), or 3,000 lb-f (1360.54 kg-f); and/or (iv) the coated conductor passes the horizontal burn test; and/or (v) the coated conductor is halogen-free; and the composition has one, some, or all of the following properties: (1) a tensile stress at break from 1,000 psi (6.90 MPa), or 2,000 psi (13.79 MPa), or 2,100 psi (14.48 MPa) to 2,200 psi (15.17 MPa), or 2,500 psi (17.24 Mpa), or 3,000 psi (20.68 MPa), or 4,000 psi (27.58 MPa), or 5,000 psi (34.47 MPa); and/or (2) a tensile elongation at break from 100%, or 300%, or 400%, or 430% to 440%, or 450%, or 500%, or 600%, or 700%, or 800%; and/or (3) a hot creep from 0%, or 1%, or 2%, or 5%, or 10%, or 15%, or 20%, or 25%, or 30%, or 35% to 40%, or 50%, or 60%, or 70%, or 75%, or 80%, or 90%, or 100%, or 150%, or 170% at 0.2 MPa and 150° C.

In an embodiment, the coated conductor is selected from a fiber optic cable, a communications cable (such as a telephone cable or a local area network (LAN) cable), a power cable, wiring for consumer electronics, a powercable, a power charger wire for cell phones and/or computers, computer data cords, power cords, appliance wiring material, home interior wiring material, consumer electronic accessory cords, and any combination thereof.

In another embodiment, the present composition is melt-shaped into an article other than a coating on a conductor, e.g., an electrical connector or a component of an electrical connector.

The coated conductor may comprise two or more embodiments disclosed herein.

By way of example, and not limitation, some embodiments of the present disclosure will now be described in detail in the following Examples.

EXAMPLES

The materials used in the examples are provided in Table 1 below.

TABLE 1

Materials

| Component | Specification | Source |
|---|---|---|
| XIAMETER ™ OFS-6300 Silane (VTMS) | hydrolyzable silane monomer vinyltrimethylsilane ($C_5H_{12}Si$) | Dow Corning |
| LUPEROX ™ 101 | organic peroxide; 2,5-bis(tert-butylperoxy)-2,5-dimethylhexane | Arkema |
| ENGAGE ™ 8402 | ethylene/1-octene copolymer (polyolefin elastomer); density = 0.902 g/cc; Melt Index = 30 g/10 min; Shore A = 88; Shore D = 34; Tm = 96° C. | Dow |
| ENGAGE ™ 8200 | ethylene/1-octene copolymer (polyolefin elastomer) density = 0.870 g/cc; Melt Index = 5.0 g/10 min; Shore A = 66; Shore D = 17; Tm = 59° C. | Dow |

TABLE 1-continued

Materials

| Component | Specification | Source |
| --- | --- | --- |
| ENGAGE ™ 8450 | ethylene/1-octene copolymer (polyolefin elastomer) density = 0.902 g/cc; Melt Index = 3.0 g/10 min Shore A = 90; Shore D = 41; Tm = 97° C. | Dow |
| DOW ™ LLDPE 1648 | linear low density polyethylene (LLDPE); density = 0.920 g/cc; Melt Index = 3.5 g/10 min; Tm = 206° C. | Dow |
| AMPLIFY ™ GR 208 | MAH-grafted ethylene/butene copolymer; density = 0.902 g/cc; Melt Index = 3.3 g/10 min; Shore A = 96; Shore D = 36; Tm = 177° C. | Dow |
| AMPLIFY ™ EA 100 | ethylene-ethyl acrylate (EEA) copolymer; 15 wt % ethyl acrylate; density = 0.930 g/cc; Melt Index = 1.3 g/10 min; Shore A = 87; Shore D = 37; Tm = 98.9° C. | Dow |
| SI-LINK ™MAC DFDB-5451 NT | ethylene/silane copolymer; 1.5 wt % vinyltrimethoxysilane; density = 0.922 g/cc; Melt Index = 1.5 g/10 min; Tm = 149-210° C. | Dow |
| KISUMA ™ 5J | magnesium hydroxide $Mg(OH)_2$; flame retardant | Kisuma |
| SAYTEX ™ 8010 | decabromodiphenylethane; brominated flame retardant ethane-1,2-bis(pentabromophenyl); Mw = 971.2 Dalton | Albemarle Corporation |
| MICROFINE ™ A09 | antimony trioxide; flame retardant synergist | Great Lakes |
| BRIGHTSUN ™ HB500 | antimony trioxide; flame retardant synergist | China Antimony |
| ZOCO ™ 104 | zinc oxide; flame retardant synergist | Zochem Inc. |
| MB50-002 Masterbatch | 50 wt % dimethylvinylsilyl terminated polydimethylsiloxane (PDMS) dispersed in LDPE LDPE Melt Index = 8.0 g/10 min; PDMS Mn = 356,700 g/mol[1]; PDMS Mw = 647,266 g/mol[1]; PDMS Mw/Mn = 1.82[1] | Dow Corning |
| hexadecyltrimethoxysilane | moisture scavenger; Molecular Weight = 346.62 g/mol | Sigma-Aldrich |
| IRGANOX ™ 1010 FF | pentaerythritol tetrakis [3-[3,5-di-tert-butyl-4-hydroxyphenyl]propionate sterically hindered phenol antioxidant; density = 1.116 g/cc; Tm = 117.1° C. | BASF |
| LOWINOX ™ MD24 PW | 1,2-bis(3,5-di-tert-butyl-4-hydroxyhydrocinnamoyl)hydrazine; metal deactivator and hindered phenolic antioxidant | Addivant |
| FUTURECHEM ™ OABH | Oxalyl bis(benzylidene)hydrazide (OABH); metal deactivator; Molecular Weight = 294.31 g/mol | FutureFuel |
| SI-LINK ™ DFDA-5481 Natural (DFDA-5481 MB) | Silanol Condensation Catalyst Masterbatch containing a blend of 1-butene/ethene polymer, ethene homopolymer, a phenolic compound, dibutyltin dilaurate (DBTDL), and a phenolic hydrazide compound | Dow |
| FASCAT ™ 4202 | dibutyltin dilaurate (DBTDL); silanol condensation catalyst | PMC |
| UVASORB ™ HA10 | hindered amine light stabilizer (CAS 136504-96-6) Mw = 11,600 Dalton; Structure (H) (depicted above) | 3 V Sigma USA |
| SABO ™ STAB UV-119 | hindered amine light stabilizer ; CAS 106990-43-6; Mw = 2,286 Dalton | SABO S.p.A. |
| TINUVIN ™ 328 | benzotriazole ultraviolet (UV) absorber | BASF |
| CHIMMASORB-81 ™ | benzophenone UV absorber | BASF |
| MB 54 | masterbatch containing 97 wt % AMPLIFY ™ EA 100 and 3 wt % SABO ™ STAB UV-119, based on total weight of the masterbatch | |

[1]Based on the average of three samples.
Dow = The Dow Chemical Company
PMC = PMC Organometallix
Future Fuel = Future Fuel Chemical Company
China Antimony = China Antimony Chemicals
Kisuma = Kisuma Chemicals (Kyowa Chemical)

A. Production of Silane-Grafted Polyethylene (Si-g-PE)

A silane-grafted polyethylene is prepared by reactive extrusion through a twin-screw extruder. 1.8 wt % of vinyltrimethoxysilane (VTMS) and 900 ppm of LUPEROX™ 101 (based on the total weight of base resin (ENGAGE™ 8402)) are weighed and mixed together followed by from 10 to 15 minutes of magnetic stirring to achieve a uniform liquid mixture. The mixture is placed on a scale and connected to a liquid pump injection. Base resin ENGAGE™ 8402 is fed into the main feeder of the ZSK-30 extruder. The barrel temperature profile of the ZSK-30 extruder is set as follows: 2-3: 160° C.; 4-5: 195° C.; 6-7: 225° C.; 8-9: 225° C.; 10-11: 170° C.; with a pellet water temperature as near to 10° C. (50° F.) as possible, and a chiller water temperature as near to 4° C. (40° C.) as possible.

The amount of VTMS grafted to the polyethylene is determined by infrared spectroscopy. Spectra are measured with a Nicolet 6700 FTIR instrument. The absolute value is measured by FTIR mode without the interference from surface contamination. The ratio of the absorbances at 1192 $cm^{-1}$ and 2019 $cm^{-1}$ (internal thicknesses) is determined. The ratio of the 1192/2019 peak heights is compared to standards with known levels of VTMS in XIAMETER™ OFS-6300 Silane. The grafted VTMS content of the silane-grafted polyethylene (Si-g-PE) is 1.7 wt %, based on the total weight of the Si-g-PE.

B. Production of Coated Conductors Using Si-g-PE

The Si-g-PE is added into a Brabender at around 140° C. and the remaining components (except the silanol condensation catalyst (SI-LINK™ DFDA-5481Natural)) are added into the bowl after the Si-g-PE is melted in amounts as specified in Table 2 below. The mixture is mixed for about 5 minutes.

The mixture is then pelletized into small pieces for wire extrusion. In the extrusion step, the silanol condensation catalyst masterbatch (SI-LINK™ DFDA-5481 Natural), is added with the pelletized mixture to extrude the composition onto 14 AWG single strand copper wire with a diameter of 0.064 inches (1.6256 mm). The composition forms a coating on the conductor. The coating is in direct contact with the conductor. The coating wall thickness is set around 30 mil (762 μm) and the extrusion temperature is from 140° C. to a head temperature of 165° C. The concentration of silanol condensation catalyst (DBTDL) in the overall composition is in the range of 0.01 wt % to 0.5 wt %.

The amount of each component present in each final composition, prior to extrusion and cure (i.e., crosslinking), is provided in Table 2 below. In other words, the wt % of each component for the individual samples is provided as the amount of each component in the formulation that is melt blended in the extruder, prior to moisture-induced crosslinking (said crosslinking occurring after extrusion).

The coated conductors are cured in a 90° C. water bath overnight (16 hours) and the cured wires are cut into segments of varying lengths for testing. The properties of the samples, including wet IR, are measured after curing (crosslinking).

The properties of each sample are provided in Table 2 below. The amounts provided in Table 2 are in weight percent, based on the total weight of the respective composition. In Table 2, "CS" refers to a comparative sample and "NM" refers to a value not measured.

As shown in Table 2, a comparative coated conductor with a coating composition containing (A) Si-g-PE, (B) a halogen-free flame retardant (KISUMA™ 5J), and (C) a HALS having a Mw less than 5,000 Dalton (SABO™ STAB UV-119) (CS 1) exhibits a wet IR of less than 800 Mohm/ 3.048 m at 90° C. from 6 hours to 24 weeks, and a Wet IR Ratio of less than 0.4.

CS 2 is a comparative coated conductor with a coating that lacks a HALS, and instead contains (A) Si-g-PE and (B) a halogen-free flame retardant (KISUMA™ 5J), and is not light stabilized. In other words, the coating composition of CS 2 is not protected from the effects of photo-oxidation, making the CS 2 coating unsuitable for wire and cable applications with UV exposure.

Applicant unexpectedly found that a coated conductor with a coating composition containing (A) Si-g-PE, (B) a halogen-free flame retardant (KISUMA™ 5J), and (C) a HALS having a Mw greater than 5,000 Dalton (UVA-SORB™ HA10) (Ex 1 and Ex 2) advantageously exhibits a wet IR of greater than 500 Mohm/3.048 m at 90° C. from 6 hours to 24 weeks, and a Wet IR Ratio greater than 0.4. In fact, Ex1 advantageously exhibits a wet IR of greater than 800 Mohm/3.048 mat 90° C. from 6 hours to 24 weeks.

TABLE 2

| | | Ex 1 | CS 1 | CS 2 | Ex 2 | CS 3 |
|---|---|---|---|---|---|---|
| Si-g-PE | | 35.31 | 35.31 | 35.39 | 35.20 | 35.31 |
| ENGAGE ™ 8200 | | 12.45 | 12.45 | 12.47 | 12.41 | 12.45 |
| ENGAGE ™ 8450 | | 2.35 | 2.35 | 2.36 | 2.34 | 2.35 |
| AMPLIFY ™ GR 208 | | 3.59 | 3.59 | 3.60 | 3.58 | 3.59 |
| KISUMA ™ 5J (Mg(OH)$_2$) | | 41.89 | 41.89 | 41.97 | 41.76 | — |
| SAYTEX ™ 8010 (brominated flame retardant) | | — | — | — | — | 31.42 |
| MICROFINE ™ A09 (antimony trioxide) | | — | — | — | — | 10.47 |
| UVASORB ™ HA10 (HALS, Mw = 11,600 Dalton) | | 0.20 | — | — | 0.50 | — |
| SABO ™ STAB UV-119 (HALS, Mw = 2,286 Dalton) | | — | 0.20 | — | — | 0.20 |
| MB50-002 Masterbatch | | 1.80 | 1.80 | 1.80 | 1.80 | 1.80 |
| hexadecyltrimethoxysilane | | 1.47 | 1.47 | 1.47 | 1.47 | 1.47 |
| IRGANOX ™ 1010 FF | | 0.31 | 0.31 | 0.31 | 0.31 | 0.31 |
| FUTURECHEM ™ OABH | | 0.04 | 0.04 | 0.04 | 0.04 | 0.04 |
| SI-LINK ™ DFDA-5481 Natural | | 0.59 | 0.59 | 0.59 | 0.59 | 0.59 |
| Total wt % | | 100 | 100 | 100 | 100 | 100 |
| Hot Creep (%) | | 38.20 | 37.77 | NM | 48.80 | 141.02 |
| Tensile Stress at Break (psi) | | 2,119 | 2,163 | 2,064 | 1,302 | 1,168 |
| Tensile Stress at Break (MPa) | | 14.61 | 14.91 | 14.23 | 8.98 | 8.05 |
| Tensile Strain at Break (%) | | 433 | 441 | 510 | 210 | 357 |
| Horizontal Burn: charred length (mm) | | 40 | 47 | NM | NM | NM |
| Horizontal Burn Pass or Fail | | Pass | Pass | NM | NM | NM |
| Crush Resistance (lb-f) | | 1,529 | 1,505 | NM | NM | NM |
| Crush Resistance (kg-f) | | 693.42 | 682.54 | NM | NM | NM |
| Wet IR at 90° C. (Mohm/3.048 m) | 6 hours | 4810 | 3170 | 4120 | 4939 | 636 |
| | 1 week | 4270 | 3520 | 4990 | 5045 | 2295 |
| | 2 weeks | 4270 | 438 | 4710 | 5369 | 2733 |
| | 3 weeks | 3720 | 3060 | 4310 | 5603 | 3479 |
| | 4 weeks | 3800 | 1650 | 3750 | 5810 | 4126 |
| | 5 weeks | 4280 | 1030 | 1990 | 3090 | 5770 |
| | 6 weeks | 4250 | 2970 | 2340 | 2410 | 6870 |
| | 7 weeks | 3920 | 750 | 2130 | 1430 | 8250 |
| | 8 weeks | 4430 | 755 | 673 | 2410 | 9130 |
| | 9 weeks | 4520 | 726 | 2760 | 1650 | 11100 |
| | 10 weeks | 4390 | NM | 3700 | 754 | 10400 |
| | 11 weeks | 4400 | NM | 2540 | 690 | 11800 |
| | 12 weeks | 4110 | NM | 2600 | 588 | 13100 |
| | 13 weeks | 4740 | NM | 2270 | 539 | 13400 |
| | 14 weeks | 5110 | NM | 3810 | 924 | 14100 |
| | 15 weeks | 4210 | NM | 3700 | 1050 | 14900 |
| | 16 weeks | 4160 | NM | 3980 | 963 | 14600 |
| | 17 weeks | 5310 | NM | 2250 | 704 | 15800 |
| | 18 weeks | 2820 | NM | 2340 | 655 | 16300 |
| | 19 weeks | NM | NM | 2390 | 679 | 16600 |
| | 20 weeks | 2270 | NM | 1740 | 924 | 15600 |
| | 21 weeks | 1560 | NM | 2130 | 1390 | 17600 |
| | 22 weeks | 1770 | NM | 1950 | 1560 | 17300 |
| | 23 weeks | 2360 | NM | 1770 | 539 | 17900 |
| | 24 weeks | 2270 | NM | 4120 | 924 | 17900 |
| | Average of weeks 4-6 | 4110 | 1883 | 2693 | 3770 | 5589 |
| | Average of weeks 7-9 | 4290 | 744 | 1854 | 1830 | 9493 |
| Wet IR Ratio (Average of weeks 7-9/Average of weeks 4-6) | | 1.04 | 0.39 | 0.69 | 0.49 | 1.70 |

CS 3 is a comparative coated conductor with a coating composition containing (A) Si-g-PE, (B) a brominated flame retardant (SAYTEX™ 8010), and (C) a HALS having a Mw less than 5,000 Dalton (SABO™ STAB UV-119). CS 3 exhibits a wet IR of greater than 800 Mohm/3.048 m at 90° C. from 6 hours to 24 weeks. Thus, CS 3 demonstrates that coating compositions containing halogenated flame retardants do not exhibit the problem of low wet IR (i.e., a wet IR of less than 500 Mohm/3.048 m at 90° C. from 6 hours to 24 weeks and/or a Wet IR Ratio of less than 0.4) that exists in coating compositions that contain halogen-free flame retardants (compare CS 3 with CS 1).

UVASORB™ HA10 and SABO™ STAB UV-119 each has piperidine functional groups. However, at the same loading, UVASORB™ HA10 (Mw=11,600 Dalton) improves the wet IR performance of the sample coating composition, or retains an acceptably high wet IR (i.e., a wet IR of greater than 800 Mohm/3.048 m at 90° C. from 6 hours to 24 weeks) and a Wet IR Ratio greater than 0.4, while CHIMASORB™ 119 (Mw=2,286 Dalton) impairs the wet IR performance of the sample coating composition.

C. Production of Coated Conductors Using Ethylene/Silane Copolymer

Masterbatches are prepared by mixing all of the components of Table 3 except for the SI-LINK™ AC DFDB-5451 NT (ethylene/silane copolymer) using a BANBURY™ mixer. The mixing is done in four phases with each component hand charged to the mixer prior to the start of the first phase. Half of the polymer base resin (DOW™ LLDPE 1648) is added to the mixer first. All the inorganic fillers and additives are then charged with the remaining polymer base resin added as a top layer. The first mixing phase uses a low ram pressure setting of 103 kPa (15 psi) and is allowed to run for 30 seconds. The second mixing phase uses a high ram pressure setting of 345 kPa (50 psi) with the ram raise occurring after a mixing temperature of 112.8° C. (235° F.) is reached. The third and fourth phases both use ram pressures of 241 kPa (35 psi) and ram raises at 140.6° C. (285° F.) and 160° C. (320° F.), respectively. The mixer jacket is neither heated or cooled, but kept neutral while the mixer rotor uses cooling water to maintain a temperature of 15.6° C. (60° F.). The total mixing time is approximately 4 minutes.

The masterbatches are melt mixed at a 58.1 wt % loading with SI-LINK™ AC DFDB-5451NT (ethylene/silane copolymer) and extruded onto 14 AWG (2.08 mm$^2$) solid copper conductors (yielding the wt % loadings of various components shown in Table 3) to make the compositions and wires of Table 3. In order to avoid premature crosslinking during extrusion, the masterbatches are dried before extrusion using a Con-Air™ desiccant dryer. The drying temperature is set to 60° C. (140° F.) and re-circulated dry air is used with a dew point setting of −40° C. (−40° F.). Drying is conducted over a 24 hours period. The dried masterbatches are weighed and sealed in foil bags prior to use in wire extrusion.

The experimental procedure used to make the wire specimens of Table 3 is as follows: Three batches of each formulation of Table 3 (5.44 kg (12 lb) each) are hand mixed and charged to the hopper feeder of the extruder. In this way, the masterbatch and the SI-LINK™ AC DFDB-5451 NT (ethylene/silane copolymer) are melt-mixed during wire extrusion to make wire constructions (14 AWG solid copper wire, 33 mil wall thickness). Each composition contains 58.1 wt % masterbatch and 41.9 wt % SI-LINK™ AC DFDB-5451 NT, based on the total weight of the composition. The wires are fabricated using a 2.5-inch Davis Standard extruder with a double-flighted Maddock™ screw and 20/40/60/20 mesh screens, at the following set temperatures (° C.) across zone 1/zone 2/zone 3/zone 4/zone 5/head/die: 129.4/135.0/143.3/148.9/151.7/165.6/165.6. The length-to-diameter (L/D) ratio of the screw is 26 (measured from the beginning of the screw flight to the screw tip) or 24 (measured from the screw location corresponding to the end of the feed casing to the screw tip). The wire construction are fabricated using screw speed of 43 rotations per minute (rpm) and line speed of 91.44 meters per minute (300 feet per minute). The wires are subsequently cured in a hot water bath set at 90° C. for at least 18 hours, to effect crosslinking of the insulation layer. After cure in the water bath, the wires are aged in an air circulating oven for 7 days at 121° C. or in a Xenon Arc™ weatherometer for 720 hours. Properties of the insulation layer or wire construction are measured after cure in the 90° C. water bath, and (in the case of tensile properties) also after aging in the 121° C. oven or the Xenon Arc™ weatherometer.

TABLE 3

|  | Ex 3 | Ex 4 | CS 4 | CS 5 |
|---|---|---|---|---|
| SI-LINK ™ AC DFDB-5451 NT (ethylene/silane copolymer) | 41.9 | 41.9 | 41.9 | 41.9 |
| DOW ™ LLDPE 1648 | 13.78 | 13.78 | 13.78 | 13.78 |
| SAYTEX ™ 8010 (brominated flame retardant) | 21.50 | 21.50 | 21.50 | 21.50 |
| BRIGHTSUN ™ HB500 (antimony trioxide) | 16.54 | 16.54 | 16.54 | 16.54 |
| ZOCO ™ 104 (zinc oxide) | 4.97 | 4.97 | 4.97 | 4.97 |
| MB 54 (97 wt % AMPLIFY ™ EA 100 and 3 wt % SABO ™ STAB UV-119)[1] | 0.23 | 0.23 | 0.23 | 0.23 |
| SABO ™ STAB UV-119 (HALS, Mw = 2,286 Dalton) | — | — | 0.35 | 0.35 |
| UVASORB ™ HA10 (HALS, Mw = 11,600 Dalton) | 0.35 | 0.35 | — | — |
| TINUVIN ™ 328 (UV absorber) | — | 0.35 | — | 0.35 |
| CHIMMASORB-81 ™ (UV absorber) | 0.35 | — | 0.35 | — |
| IRGANOX ™ 1010 FF (antioxidant) | 0.17 | 0.17 | 0.17 | 0.17 |
| FASCAT ™ 4202 (silanol condensation catalyst) | 0.13 | 0.13 | 0.13 | 0.13 |
| LOWINOX ™ MD24 PW (antioxidant) | 0.08 | 0.08 | 0.08 | 0.08 |
| Total wt % | 100 | 100 | 100 | 100 |
| Hot Creep (%) | 29 | 29 | 28 | 30 |
| Hot Deformation (%) | 13 | 12 | 13 | 14 |
| Retained ACBD after Glancing Impact (%) | 92 | 90 | 7 | 52 |
| Tensile Stress at Break (psi) | 2013 | 2280 | 2191 | 2170 |
| Tensile Stress at Break (MPa) | 13.88 | 15.72 | 15.11 | 14.96 |
| Tensile Strain at Break (%) | 320 | 310 | 280 | 304 |
| Retained Tensile Strength after 7 days in an oven at 121° C. (%) | 91 | 92 | 92 | 93 |
| Retained Tensile Elongation after 7 days in an oven at 121° C. (%) | 84 | 84 | 90 | 85 |
| Retained Tensile Strength after 30 days in weatherometer | 90 | 89 | 87 | 92 |
| Retained Tensile Elongation after 30 days in weatherometer | 81 | 78 | 21 | 79 |
| Crush Resistance (lb-f) | 1571 | 1757 | 1660 | 1400 |
| Crush Resistance (kg-f) | 712.47 | 796.83 | 752.83 | 634.92 |

TABLE 3-continued

|  | Ex 3 | Ex 4 | CS 4 | CS 5 |
|---|---|---|---|---|
| Horizontal Burn Pass or Fail | Pass | Pass | Pass | Pass |
| Horizontal Burn: charred length (mm) | 34 | 46 | 34 | 41 |
| VW-1 Pass or Fail | Pass | Pass | Pass | Pass |
| VW-1: Maximum Burn Duration (sec) | 24 | 28 | 35 | 28 |
| VW-1: uncharred length (mm) | 154 | 173 | 141 | 178 |

[1] based on the total weight of the MB 54 masterbatch

A comparative coated conductor with a coating composition containing (A) ethylene/silane copolymer (SI-LINK™ AC DFDB-5451 NT), (B) a halogenated flame retardant (SAYTEX™ 8010), and (C) a HALS having a Mw less than 5,000 Dalton (SABO™ STAB UV-119) (CS 4 and CS 5) exhibits (i) a retained ACBD after glancing impact of less than 75%, (ii) a retained tensile strength after 7 days in an oven at 121° C. of less than 94%, (iii) a retained tensile elongation after 7 days in an oven at 121° C. of less than 87%, (iv) a retained tensile strength after 30 days in a weatherometer of less than 95%, and (v) a retained tensile elongation after 30 days in a weatherometer of less than 81%.

Applicant unexpectedly found that a coated conductor with a coating composition containing (A) ethylene/silane copolymer (SI-LINK™ AC DFDB-5451 NT), (B) a halogenated flame retardant (SAYTEX™ 8010), and (C) a HALS having a Mw greater than 5,000 Dalton (UVA-SORB™ HA10) (Ex 3 and Ex 4) advantageously exhibits (i) a retained ACBD after glancing impact greater than 75%, (ii) a retained tensile strength after 7 days in an oven at 121° C. greater than 94%, (iii) a retained tensile elongation after 7 days in an oven at 121° C. greater than 87%, (iv) a retained tensile strength after 30 days in a weatherometer greater than 95%, and (v) a retained tensile elongation after 30 days in a weatherometer greater than 81%.

It is specifically intended that the present disclosure not be limited to the embodiments and illustrations contained herein, but include modified forms of those embodiments including portions of the embodiments and combinations of elements of different embodiments as come within the scope of the following claims.

We claim:
1. A composition comprising:
   20 wt % to 80 wt % of a silane functionalized polyolefin based on a total weight of the composition, wherein the silane functionalized polyolefin comprises 1.0 wt % to 5.0 wt % silane based on the total weight of the silane functionalized polyolefin;
   5 wt % to 40 wt % of a halogenated flame retardant or 20 wt % to 70 wt % of a halogen-free flame retardant based on a total weight of the composition; and
   0.1 wt % to 0.5 wt % a hindered amine light stabilizer (HALS) based on a total weight of the composition, wherein the HALS has a weight average molecular weight, Mw, greater than 5,000 Dalton (g/mol), further wherein the HALS has a Structure (H):

Structure (H)

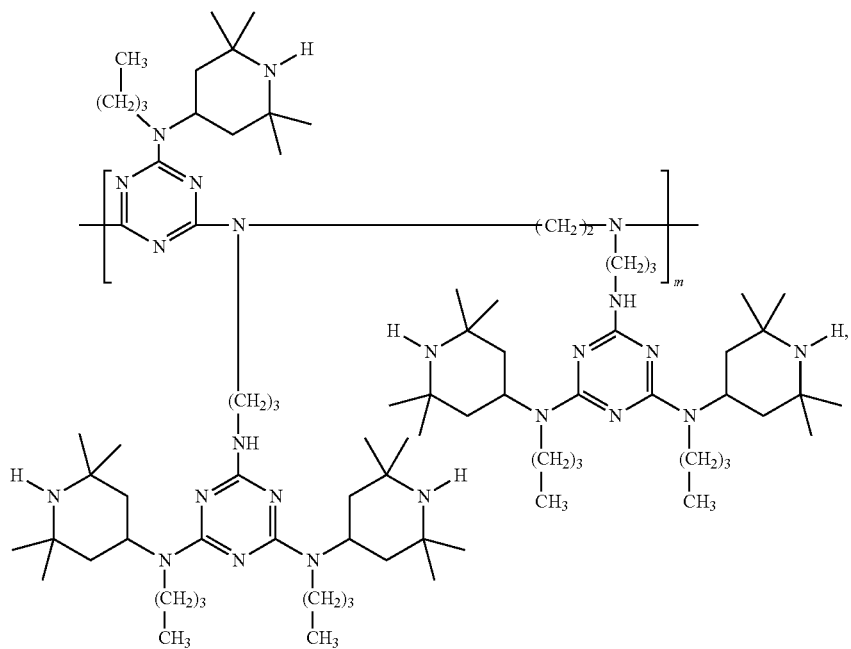

wherein m is an integer from 3 to 20, wherein the composition yields a wet insulation resistance (IR) ratio from 0.4 to 20.0.

2. The composition of claim 1, wherein the HALS has a Mw from greater than 5,000 Dalton to 50,000 Dalton.

3. The composition of claim 1, wherein the silane functionalized polyolefin is selected from the group consisting of a silane-grafted ethylene-based polymer and an ethylene/silane copolymer.

4. The composition of claim 1, wherein the flame retardant is a halogen-free flame retardant.

5. The composition of claim 1, wherein the flame retardant is a halogenated flame retardant.

* * * * *